United States Patent
Kawasaki et al.

(10) Patent No.: US 6,798,734 B1
(45) Date of Patent: Sep. 28, 2004

(54) OPTICAL RECORDING MEDIUM HAVING ADDRESS PITS IN THE HEADER REGION CONNECTING WITH EACH OTHER

(75) Inventors: Tatsuo Kawasaki, Kanagawa (JP); Koyata Takahashi, Kanagawa (JP); Kenichi Sekimoto, Kanagawa (JP); Toru Futami, Kanagawa (JP); Shigeru Hiramatsu, Kanagawa (JP); Mutsumi Asano, Kanagawa (JP); Yuji Kawara, Yamagata (JP); Tsuyoshi Tanaka, Kanagawa (JP)

(73) Assignee: Tosoh Corporation, Yamaguchi (JP)

( * ) Notice: Subject to any disclaimer, the term of this patent is extended or adjusted under 35 U.S.C. 154(b) by 194 days.

(21) Appl. No.: 09/787,811

(22) PCT Filed: Jul. 26, 2000

(86) PCT No.: PCT/JP00/04979

§ 371 (c)(1), (2), (4) Date: Jul. 3, 2001

(87) PCT Pub. No.: WO94/20954

PCT Pub. Date: Sep. 15, 1994

(30) Foreign Application Priority Data

Jul. 26, 1999 (JP) .............................................. 11-210346
Apr. 14, 2000 (JP) ...................................... 2000-118522

(51) Int. Cl.$^7$ ................................................. G11B 7/24
(52) U.S. Cl. .................... 369/275.4; 369/275.3
(58) Field of Search ........................... 369/275.4, 275.3, 369/44.26, 47.27, 53.28, 53.2, 53.41, 278, 279, 275.2

(56) References Cited

U.S. PATENT DOCUMENTS

| | | | | |
|---|---|---|---|---|
| 5,099,467 A | * | 3/1992 | Sumihiro et al. | 369/44.26 |
| 5,235,576 A | * | 8/1993 | Shigemori | 369/32 |
| 5,295,127 A | * | 3/1994 | Verboom et al. | 369/58 |
| 5,321,675 A | * | 6/1994 | Ito et al. | 369/32 |
| 5,329,509 A | * | 7/1994 | Takahara et al. | 369/44.26 |
| 5,452,285 A | * | 9/1995 | Monen | 369/275.3 |
| 5,574,706 A | * | 11/1996 | Verboom et al. | 369/44.26 |
| 5,907,448 A | | 5/1999 | Watanabe et al. | |
| 6,144,517 A | | 11/2000 | Watanabe et al. | |

FOREIGN PATENT DOCUMENTS

| | | |
|---|---|---|
| JP | 02-044576 | 2/1990 |
| JP | 02-260250 | 10/1990 |
| JP | 2000-163893 | 6/2000 |

OTHER PUBLICATIONS

B.D. Terris et al., "Near–field optical data storage", Appl. Phys. Lett., 68 (2), Jan. 8, 1996, pp. 141–143.

* cited by examiner

Primary Examiner—Tan Dinh
(74) Attorney, Agent, or Firm—Sughrue Mion, PLLC

(57) ABSTRACT

An optical recording medium able to reproduce address information during seeking in which an optical head moves between tracks, to increase seek speed, to improve recording/reproduction speed and to obtain a good header reproducing signal is achieved by that the concave portions or convex portions constituting a reproducing signal in seeking reproduced even during seek and/or constituting a timing signal for writing a header signal are connected to each other in a direction orthogonal to the tracks, when these concave portions and/or convex portions are placed in positions equivalent to each other in the adjacent tracks.

20 Claims, 14 Drawing Sheets

⟨⟨⟨ main beam exposure portion

▮▮▮ overlap exposure portion of main beam and sub beam

||||| sub beam exposure portion main beam exposure portion overlap exposure portion of main beam and sub beam sub beam exposure portion

OPTICAL RECORDING MEDIUM HAVING ADDRESS PITS IN THE HEADER REGION CONNECTING WITH EACH OTHER

TECHNICAL FIELD

The present invention relates to an optical recording medium, particularly to a magneto-optical recording medium for recording, reproducing and erasing information with a laser beam and a magnetic field, and further to a surface reproduction type magneto-optical recording medium in which a recording film is directly irradiated with a laser beam without passing through a substrate, or a surface reproduction type phase-change recording medium for recording, reproducing and erasing information only with a laser beam.

BACKGROUND ART

Optical recording media are portable recording media in which large-capacity, high-density recording is possible, and demand therefor has rapidly increased as rewritable media for recording large-capacity files of computers or moving pictures, with recent development of multi-media systems.

In the optical recording medium, a multi-layer film containing a recording layer is generally formed on a transparent disk-shaped substrate made of a plastic resin or the like, recording or erasing is made by irradiation of a laser beam, and reproduction is conducted by reflected light of a laser. The optical recording media include rewritable erasable type ones such as magneto-optical recording media and phase-change recording media, and write once-type ones which are writable only once such as CD-Rs. As for the magneto—optical recording media, so-called light intensity modulation recording has hitherto been mainly employed, in which after erasing by application of a fixed magnetic field, a magnetic field fixed in the opposite direction is applied to conduct recording. Lately, however, a magnetic field modulation method has been noted, in which a magnetic field is modulated in accordance with a recording pattern while irradiating a laser beam, as a method capable of recording (direct overwriting) by one revolution, and capable of accurately recording even when the recording density becomes high. The phase-change recording media are possible in direct overwriting with light modulation recording, and reproducible with the same optical system as that of CDs or DVDS, which causes their recent significant growth. The write once-type CD-Rs are completely compatible with the CDs, so that they have been widely popularized.

Recording layers have hitherto been irradiated with lasers for recording and reproduction through substrates. As a means for increasing the recording density, the so-called near-field optical recording method has recently noted, in which method recording and reproduction are operated by an optical head brought near a recording film (Appl. Phys. Lett. 68, p.141 (1996)). In this recording method, a solid immersion lens (hereinafter referred to as SIL) head is used to minimize the laser beam spot size, thereby making it possible to reproduce a mark shorter than that of the former recording limit (~$\lambda$/2NA, wherein NA indicates the numerical aperture of an objective lens) determined by the laser wavelength. ($\lambda$) of a light source, resulting in the achievement of recording and reproduction with super high recording density. In this near-field optical recording, it is necessary that the optical head is brought near the recording medium (200 nm or less). Therefore, a method (surface reproduction type recording) is used in which recording layers are irradiated with laser beams directly without passing through substrates, unlike the conventional magneto-optical recording media in which recording films are irradiated through substrates. In this case, the use of a flying type slider head is proposed in order to bring the SIL head near the recording film.

In the optical recording medium, a track is generally formed in approximately concentric circle form or in approximately helical form, and divided into tens to hundreds of sectors. Each sector has a data recording region for recording data of a user himself and a header region for recording information for reproducing an address and so on of each sector (hereinafter referred to as header information).

In general, methods for recording header signals include a method of forming unevenness on a master plate by previously controlling the on/off of irradiation of a laser beam in a mastering process, and transferring it to a substrate by a molding process, thereby recording the signal (hereinafter referred to as pit format). Besides above, a method of forming only a reference signal showing the writing timing of a header signal in a header region in mastering and molding processes, leaving flat almost all portions succeeding to the header region, and recording the signal by the same system as that of recording data later (hereinafter referred to as soft format). In the pit format, a concave portion of the unevenness pattern constituting the header signal is referred to as a pit, and a convex portion thereof is referred to as a mark. In the case of the soft format, a reference signal indicating timing for writing a header signal is referred to as a timing pattern. In either case of the soft format or the pit format, a guide groove of a data writing region is referred to as a groove, and the other is referred to as a land.

As for the header signal, like CDs, address information and the like is generally recorded by the position or the length of a pit narrower in the width in a direction orthogonal to a track than the track width. Further, header information is reproduced by detecting a change in the amount of reflected light due to diffraction from a pit when a laser beam is irradiated.

Tracking is conducted by detecting diffracted light from a circumferentially continuous groove or a pit for a sample servo. In the case of the pit format, the header signal is detected by a change in the amount of light caused by an interference effect of reflected light on a pit portion and reflected light on a flat portion. On the other hand, in the case of the soft format, reading is carried out in the same manner as in the data recording region. However, in writing the header signal, detection of a timing signal is required, and a change in the amount of light caused by an interference effect of reflected light on a timing pit portion and reflected light on a flat portion are utilized therefor similarly with the pit format.

In an optical recording apparatus, the transfer of a laser beam between tracks apart from each other is called seek. The basic operation of recording/reproduction of the optical recording medium comprises allowing an optical head to seek to a desired track for recording/reproduction, and detecting the number of the desired track and the number of a sector, followed by recording/reproduction. Previously, the seek has been a system of calculating the radius value of a desired track, roughly moving an optical head, conducting a tracking operation at that place to detect the track number, detecting the difference between the track number and the number of the desired track, further minutely moving the optical head, and then conducting the tracking operation to detect the track number, which are repeated to reach the desired track.

Efforts have been made such as counting the number of tracks over which an optical head has passed during seeking in order to shorten the seeking time, or increasing the number of rotations of a medium in order to decrease the rotational latency. In recent years, attempts have been made to incorporate a gray code into a header, for example, as indicated in Unexamined Published Japanese Patent Application No. 6-259709. The track number has a different value for each track. However, when the gray code is used, the difference in the circumferential pit pattern arrangement between tracks adjacent to each other is always one minimum recording unit (wherein the minimum recording unit is a signal shortest in circumferential length, of signals formed in a header region by an unevenness pattern, and the length of all patterns is an integral multiple of this length). Accordingly, almost all pit pattern arrangements constituting pit patterns corresponding to the track numbers, particularly almost all pit arrangements indicating higher figures of the track numbers show the same pattern on each track. The use of the gray code allows the detection of a track position within an accuracy of ±1 track even during seeking to achieve high-speed seek with high accuracy.

The present inventors tried to incorporate a conventional gray code in which pits having an aperture width narrower than a track width are arranged in order to prepare a high-speed seek medium. However, using the prepared medium in reproducing, when a beam was positioned on a track boundary, no sufficient reproducing signal was obtained, which caused the difficulty of header reproduction during seeking.

An object of the present invention is to provide an optical recording medium on which a gray code can be well read during seeking.

DISCLOSURE OF THE INVENTION

In view of the present state as described above, the present inventors have conducted intensive investigation. As a result, the present inventors have discovered that either in the pit format or in the soft format, reproduction of the track number and the sector number becomes possible either during tracking or during seeking by specifying the shape of an unevenness pattern constituting a signal thereof, thus completing the invention.

The present invention relates to an optical recording medium having a header region in which at least a signal for address reproduction is recorded by an unevenness pattern on a substrate, wherein, in the header region, an unevenness pattern corresponding to a reproducing signal in seeking reproduced when an optical head moves between tracks in recording/reproduction of the optical recording medium is comprised of concave portions constituting the reproducing signal in seeking, and wherein the concave portions in positions equivalent to each other between two or more adjacent tracks are connected to each other in a direction orthogonal to the tracks.

An edge of the connected concave portions of the above-mentioned optical recording medium, the edge being approximately parallel to a direction orthogonal to the tracks, is preferably formed as a boundary between a concave portion and a portion where no concave is formed on the medium.

Further, it is preferred that a continuous portion formed by a series of edges of the connected concave portions of the above-mentioned optical recording medium, which series of edges is in a direction crossing the tracks, is formed in an approximately linear shape approximately parallel to a direction orthogonal to the tracks as a whole, and that the degree of swelling thereof is not more than one third of the minimum recording unit.

Still further, it is preferred that a continuous portion formed by a series of edges of the connected concave portions of the above-mentioned optical recording medium, which series of edges is in a direction crossing the tracks, is formed in an arc shape along a locus of the moving optical head as a whole, and that the degree of swelling thereof is not more than one third of the minimum recording unit.

Furthermore, the concave portions constituting the reproducing signal in seeking which has no adjacent concave portions constituting the reproducing signal in seeking in the equivalent position on the adjacent track is formed beyond a boundary line between the track having the concave portion and the adjacent track to protrude into apart of the adjacent track.

The present invention further relates to an optical recording medium having a header region in which at least a signal for address reproduction is recorded by an unevenness pattern on a substrate, wherein, in the header region, an unevenness pattern corresponding to a reproducing signal in seeking reproduced when an optical head moves between tracks in recording/reproduction of the optical recording medium is comprised of convex portions constituting the reproducing signal in seeking, and wherein the convex portions in positions equivalent to each other between two or more adjacent tracks are connected to each other in a direction orthogonal to the tracks.

An edge of the connected convex portions of the above-mentioned optical recording medium, the edge being approximately parallel to a direction orthogonal to the tracks, is preferably formed as a boundary between a convex portion and a portion where a concave is formed.

Further, it is preferred that a continuous portion formed by a series of edges of the connected convex portions of the above-mentioned optical recording medium, which series of edges is in a direction crossing the tracks, is formed in an approximately linear shape approximately parallel to a direction orthogonal to the tracks as a whole, and that the degree of swelling thereof is not more than one third of the minimum recording unit.

Still further, it is preferred that a continuous portion formed by a series of edges of the connected convex portions of the above-mentioned optical recording medium, which series of edges is in a direction crossing the tracks, is formed in an arc shape along a locus of the moving optical head as a whole, and that the degree of swelling thereof is not more than one third of the minimum recording unit.

It is further preferred that, of the above-mentioned optical recording medium, a convex portion constituting the reproducing signal in seeking which has no adjacent convex portions constituting the reproducing signal in seeking in the equivalent position on the adjacent track, do not reach a boundary line between the track having the convex portion and the above-mentioned adjacent track.

Furthermore, the present invention relates to an optical recording medium having a flat portion for writing a header signal, and a header region in which a timing signal indicating timing for writing the header signal is recorded in a part of the flat portion by an unevenness pattern on a substrate, wherein convex portions and/or concave portions constituting the above-mentioned timing signal are formed by connecting them to each other across a plurality of tracks in a direction crossing the tracks.

It is preferred that the convex portions and/or concave portions constituting the timing signal for writing the header signal of the above-mentioned optical recording medium are formed by connecting them to each other from the most inner periphery to the most outer periphery.

It is preferred that an edge of the connected convex portions and/or concave portions constituting the timing signal for writing the header signal of the above-mentioned optical recording medium, which edge is in a direction crossing the tracks, is formed in an approximately linear shape approximately parallel to a direction orthogonal to the tracks as a whole, and that the degree of swelling thereof is not more than one third of the minimum recording unit.

Further, it is preferred that an edge of the connected convex portions and/or concave portions constituting the timing signal for writing the header signal of the above-mentioned optical recording medium, which edge is in a direction crossing the tracks, is formed in an arc shape along a locus of the moving optical head as a whole, and that the degree of swelling thereof is not more than one third of the minimum recording unit.

In addition, the present invention relates to an optical recording medium having a header region in which header information containing at least a signal for address reproduction or a signal acting as a reference for address writing is recorded by an unevenness pattern on a substrate, and conducting recording and/or reproduction using both of land tracks formed on lands and groove tracks formed on grooves, wherein when concave portions and/or convex portions constituting the reproducing signal in seeking reproduced in the movement of an optical head between the tracks are in positions equivalent to each other between two or more adjacent tracks, they are connected to each other in a direction orthogonal to the tracks.

The land tracks and groove tracks of the above-mentioned optical recording medium may each have different header information.

Further, a pair of land track and groove track adjacent to each other of the above-mentioned optical recording medium may share header information.

Still further, when the concave portions and/or convex portions constituting the reproducing signal in seeking of the above-mentioned optical recording medium are not in positions equivalent to each other between the tracks adjacent to each other, it is preferred that a boundary between the concave portions and the convex portions constituting the reproducing signal in seeking is rather on the side of the convex portions constituting the reproducing signal in seeking than a track boundary.

Furthermore, when the concave portions and/or convex portions constituting the reproducing signal in seeking of the above-mentioned optical recording medium are not in positions equivalent to each other between the tracks adjacent to each other, it is preferred that a boundary between the concave portions and the convex portions constituting the reproducing signal in seeking is rather on the side of the convex portions constituting the reproducing signal in seeking than a track boundary.

Further, it is preferred that an edge of the connected concave portions and/or convex portions constituting the reproducing signal in seeking which are in positions equivalent to each other between two or more adjacent tracks of the above-mentioned optical recording medium, which edge is in a direction crossing the tracks, is formed in an approximately linear shape approximately parallel to a direction orthogonal to the tracks as a whole, and that the degree of swelling thereof is not more than one third of the minimum recording unit.

Furthermore, it is preferred that an edge of the connected concave portions and/or convex portions which are in positions equivalent to each other between two or more adjacent tracks of the above-mentioned optical recording medium, which edge is in a direction crossing the tracks, is formed in an arc shape along a locus of the moving optical head as a whole, and that the degree of swelling thereof is not more than one third of the minimum recording unit.

BEST MODE FOR CARRYING OUT THE INVENTION

Figure 1:
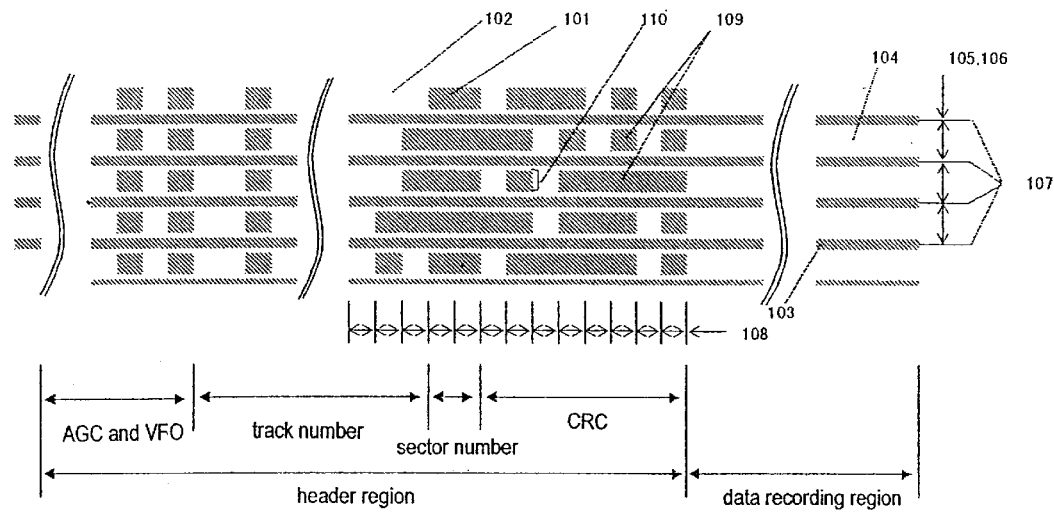
FIG. 1 is a conceptual illustration showing an unevenness pattern of a conventional header region in land recording-pit format.

Previously, the header signal has been detected by a change in the amount of light caused by an interference effect of reflected light on a pit portion and reflected light on a flat portion. In the present invention, however, a system of detecting with a two-division detector or the like a change in circumferential diffraction light occurring at the time when a beam passes on a circumferential step portion between a pit portion and a mark portion (hereinafter referred to as an edge detection process) is employed.

That is to say, the first optical recording medium of the present invention is a pit format type optical recording medium having a header region in which a signal for address reproduction is recorded by an unevenness pattern on a substrate, wherein, in the above-mentioned header region, an unevenness pattern corresponding to a reproducing signal in seeking reproduced when an optical head moves between tracks in recording/reproduction of the optical recording medium is comprised of concave portions constituting the reproducing signal in seeking, and wherein the concave portions in positions equivalent to each other between two or more adjacent tracks are connected to each other (penetrating through them) in a direction orthogonal to the tracks.

The second optical recording medium of the present invention is an optical recording medium having a header region in which at least a signal for address reproduction is recorded by an unevenness pattern on a substrate, wherein, in said header region, an unevenness pattern corresponding to a reproducing signal in seeking reproduced when an optical head moves between tracks in recording/ reproduction of the optical recording medium is comprised of convex portions constituting the reproducing signal in seeking, and wherein said convex portions in positions equivalent to each other between two or more adjacent tracks are connected to each other in a direction orthogonal to the tracks.

The term "signal for address reproduction" as used in the present invention means an AGC signal, a VFO signal, a CRC signal, a sector number, a track number or the like described later. In the present invention, it does not necessarily contain all of these signals, as long as it can specify an address. Further, one signal having a plurality of signal functions may be used.

Further, the term "in positions equivalent to each other between adjacent tracks" as used herein means positioning, for example, on a straight line orthogonal to the tracks or on an arc corresponding to a locus of a moving head, beyond the tracks adjacent to each other, or being arranged along a straight line orthogonal to the tracks or along an arc corresponding to a locus of a moving head, with concave portions adjacent to each other and convex portions adjacent to each other, when an unevenness arrangement of each track is compared for every minimum recording unit.

When the concave portions constituting the reproducing signal in seeking are arranged in; the same positions parallel to the circumferential direction between the tracks adjacent to each other, these are connected in a diameter direction, thereby forming the connected concave portions constituting the reproducing signal in seeking (concave pattern). Similarly, when the convex portions constituting the reproducing signal in seeking are arranged side by side, these are connected in a diameter direction, thereby forming the connected convex portions constituting the reproducing signal in seeking (convex pattern). In the present invention, the concave portions constituting the reproducing signal in seeking connected in a direction orthogonal to the tracks are called "connected concave portions constituting the reproducing signal in seeking". Also, the convex portions constituting the reproducing signal in seeking connected in a direction orthogonal to the tracks are called "connected convex portions constituting the reproducing signal in seeking". However, it is preferred that the shape of the connected concave portions or the connected convex portions constituting the reproducing signal in seeking (concave pattern or convex pattern) as a whole is approximately linear when the head moves linearly, and approximately arc-like when the header moves in an arc shape. The term "minimum recording unit" means the minimum unit of the length in a track direction of the concave portions or convex portions constituting an unevenness pattern corresponding to a header signal. The concave portions or the convex portions constituting the reproducing signal in seeking are also formed to have a length of an integral multiple of this length.

Figure 3:
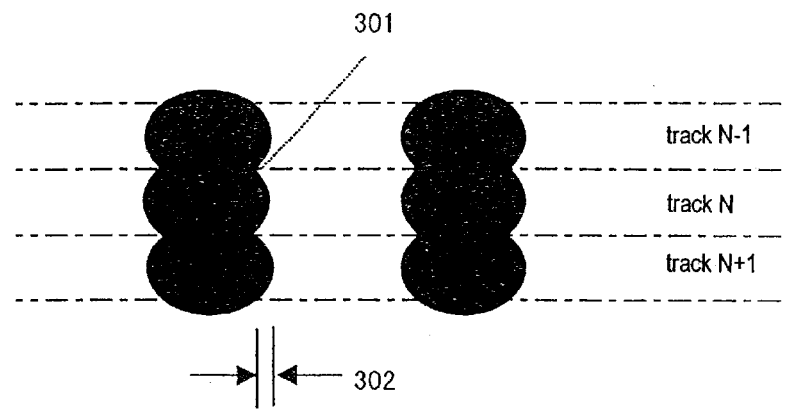
FIG. 3 is a schematic view illustrating a swell in the present invention.

FIG. 3 shows concave portions formed by connecting (penetrating) them to each other across 3 tracks. In the present invention, the concave portions formed by connecting them to each other (or the concave portions formed by penetrating through them) in a direction orthogonal to the tracks means concave portions connected without any barriers dividing the concave portions into parts between the tracks, as shown in FIG. 3. In the present invention, when the concave portions are connected across a plurality of tracks, not only the concave portions are formed in a linear shape in a direction orthogonal to the tracks as a whole, as shown in FIG. 3, but also formed in an arc shape as a whole, a shape as shown as 402 of FIG. 4. Further, the convex portions formed by connecting them to each other in a direction orthogonal to the tracks in the present invention also means convex portions connected without any channels dividing the convex portions into parts between the tracks, similarly to the above-mentioned concave portions. When the convex portions are connected across a plurality of tracks, not only the convex portions are formed in a linear shape in a direction orthogonal to the tracks as a whole, but also formed in an arc shape as a whole, a shape as shown as 402 of FIG. 4. They may be continuously formed over the whole area of a recording region (for example, from the most outer periphery to the most inner periphery of a recording region of a disk-shaped recording medium). However, it is not necessarily required to be formed over the whole recording region, as long as the above-mentioned relationship is satisfied across at least two or more tracks.

As to the optical recording medium of the invention, it is not required that only the concave portions or convex portions constituting the reproducing signal in seeking having the same length in a track direction are connected in a direction orthogonal to the trucks. Even when ones different in length are adjacent to each other, they may be connected in a direction orthogonal to the trucks.

Further, the reproducing signal in seeking is a signal reproduced in seeking, that is to say, during the movement of the optical head between the tracks. The above reproducing signal in seeking may be either a signal reproduced in seeking and also after completion of tracking adjustment, or a signal reproduced only in seeking.

Furthermore, when the concave portions or convex portions constituting the reproducing signal in seeking are not in positions equivalent to each other between the tracks adjacent to each other, the concave portions or convex portions connected in a direction orthogonal to the tracks end to form an edge in a direction parallel to the tracks. This edge may be formed on a boundary line between two tracks. However, in consideration of cross talk, the edge is preferably formed so that the concave portions are somewhat increased, not on the boundary line between two tracks. That is to say, with respect to the concave portions constituting the reproducing signal in seeking, the edge is preferably formed beyond a boundary line with the adjacent track to protrude into a part of the above-mentioned adjacent track. Namely, it is preferably formed so as to protrude into the adjacent track rather than the boundary line between two tracks. Conversely, with respect to the convex portions constituting the reproducing signal in seeking, the edge is preferably formed so as not to reach a boundary line with adjacent tracks. Namely, it is preferably formed somewhat on the side where the convex portions exist of the track boundary line. The spacing between the edge and the track boundary line is preferably 100 nm or less.

Further, an edge in a direction crossing the tracks of the connected concave portions or convex portions constituting the reproducing signal in seeking in the present invention is not necessarily composed of a straight line. In the present invention, the edge in a direction crossing the tracks is also referred to as the edge approximately parallel to a direction orthogonal to the tracks. In the recording medium having concentric circular or helical tracks using a disk-shaped substrate, the direction orthogonal to the tracks is a radial direction (diameter direction), and they are not necessarily parallel to each other. In the present invention, therefore, the terms "parallel", "orthogonal", etc. are not always used with mathematical strictness. And the terms "parallel" and "approximately parallel", and "orthogonal" and "approximately orthogonal" each have the same meaning. Further, the same applies to "straight line" and "approximately straight line", and "arc" and "approximately arc" or "arc-like". These are the same in the third and fourth optical recording media of the present invention described later.

In the first optical recording medium of the present invention, it is preferred that the edge approximately parallel to a direction orthogonal to the tracks of the connected concave portions constituting the reproducing signal in seeking is formed as a boundary between a concave portion and a portion where no concave is formed on the medium. In the second optical recording medium of the present invention, it is preferred that the edge approximately parallel to a direction orthogonal to the tracks of the connected convex portions constituting the reproducing signal in seeking is formed as a boundary between a convex portion and a portion where a concave is formed on the medium.

In the first optical recording medium of the present invention, it is preferred that a continuous portion formed by a series of edges of the connected concave portions constituting the reproducing signal in seeking, which series of edges is in a direction crossing the tracks, is formed in an approximately linear shape approximately parallel to a direction orthogonal to the tracks as a whole, and it is more preferred that the degree of swelling thereof is not more than one third of the minimum recording unit.

On the other hand, it is preferred that a continuous portion formed by a series of edges of the connected concave portions constituting the reproducing signal in seeking, which series of edges is in a direction crossing the tracks, is formed in an arc shape along a locus of the moving optical head as a whole, and it is more preferred that the degree of swelling thereof is not more than one third of the minimum recording unit.

Similarly, also in the second optical recording medium of the present invention, it is preferred that a continuous portion formed by a series of edges of the connected convex portions constituting the reproducing signal in seeking, which series of edges is in a direction crossing the tracks, is formed in an approximately linear shape approximately parallel to a direction orthogonal to the tracks as a whole, and it is more preferred that the degree of swelling thereof is not more than one third of the minimum recording unit.

On the other hand, it is preferred that a continuous portion formed by a series of edges of the connected convex portions constituting the reproducing signal in seeking, which series of edges is in a direction crossing the tracks, is formed in an arc shape along a locus of the moving optical head as a whole, and it is more preferred that the degree of swelling thereof is not more than one third of the minimum recording unit.

The term "swelling" as used herein means a deviation 302 from a straight line, which occurs in a connected portion 301 of the concave portions formed by connecting them to each other between a plurality of tracks or convex portions formed by the same, as shown in FIG. 3. The shape of the series of edges in a direction crossing the tracks on a medium surface of the connected concave portions or convex portions constituting the reproducing signal in seeking continuously formed across two or more adjacent tracks is linear or arc-shaped as a whole. However, microscopically, the series of edges is a curve obtained by connecting curves having a length of an approximately trackwidth as shown in FIG. 3. On the other hand, when only two adjacent tracks are considered, it is possible to determine a straight line tangent to outer sides of the concave portions or convex portions, and a straight line tangent to the connected portion 301 of the concave portions or convex portions and parallel to the above-mentioned straight line tangent to the outer sides. The value obtained by measuring the distance between these two straight lines in a track direction is defined as the degree of swelling. In the optical recording medium of the present invention, it is preferred that the maximum degree of swelling thus defined is not more than one third of the minimum recording unit. For preventing the timing deviation of the header signal, the degree of swelling is preferably smaller, and more preferably one fourth or less the minimum recording unit. For example, taking the minimum recording unit as 380 nm, the above-mentioned degree of swelling is preferably 126 nm or less, and more preferably 95 nm or less.

Further, although this swelling occurs, for example, by forming an unevenness pattern by use of a circular exposure beam, it can be reduced by optimizing the beam diameter, the intensity, on-off timing, and the like of the exposure beam.

The above is also the same in the third and fourth optical recording media of the present invention described later.

In the above, the first optical recording medium of the present invention has been illustrated as one in which the concave portions constituting the reproducing signal in seeking are connected, and the second optical recording medium has been illustrated as one in which the convex portions constituting the reproducing signal in seeking are connected. However, in both cases, the concave portions constituting the reproducing signal in seeking may be connected to each other and so may be the convex portions constituting the reproducing signal in seeking.

The third optical recording medium of the present invention is an optical recording medium having a flat portion for writing a header signal, and a header region in which a timing signal indicating timing for writing the header signal is recorded in a part of the flat portion by an unevenness pattern on a substrate, wherein convex portions and/or concave portions constituting the timing signal are formed by connecting them to each other across a plurality of tracks in a direction crossing the tracks. In the recording medium having concentric circular or helical tracks using a disk-shaped substrate, it is preferred that the convex portions and/or concave portions constituting the timing signal for writing the header signal are formed by connecting them to each other from an inner periphery to an outer periphery in a diameter direction of the medium (that is to say, from the most inner periphery to the most outer periphery of a recording region of the above-mentioned optical recording medium).

In the present invention, the convex portions or the concave portions connected in a direction orthogonal to the tracks and constituting the timing signal for writing the header signal is called "the connected convex portions constituting the timing signal for writing the header signal" or "the connected concave portions constituting the timing signal for writing the header signal". It is preferred that an edge of the connected concave portions and/or convex portions constituting the timing signal for writing the header signal, which edge is in a direction crossing the tracks, is formed in an approximately linear shape approximately parallel to a direction orthogonal to the tracks as a whole, and that the degree of swelling thereof is not more than one third of the minimum recording unit. The degree of swelling is more preferably one fourth or less the minimum recording unit.

On the other hand, it is preferred that an edge of the connected concave portions and/or convex portions constituting the timing signal for writing the header signal, which edge is in a direction crossing the tracks, is formed in an arc shape along a locus of the moving optical head as a whole, and that the degree of swelling thereof is not more than one third of the minimum recording unit. The degree of swelling is more preferably one fourth or less the minimum recording unit.

The term "minimum recording unit" as used herein means the minimum unit of the length in a track direction of the header signal recorded on a flat portion of the header region by the same system as that of data recording. And the minimum recording unit corresponds to the minimum unit of the length in a track direction of the concave portions or the convex portions in the pit format. For example, taking the minimum recording unit as 380 nm, the above-mentioned degree of swelling is preferably 126 nm or less, and more preferably 95 nm or less.

The above-mentioned invention can also be applied to an optical recording medium in which recording and/or reproduction is conducted in using both of land tracks formed on lands and groove tracks formed on grooves. In this case, the land tracks and the groove tracks may each have different header information, or a pair of land track and groove track adjacent to each other may share the same header information.

That is to say, the fourth optical recording medium of the present invention is an optical recording medium having a header region in which header information containing at least a signal for address reproduction or a signal acting as a reference for address writing is recorded by an unevenness pattern on a substrate, and conducting recording and/or reproduction using both of land tracks formed on lands and groove tracks formed on grooves, wherein when concave portions and/or convex portions constituting the reproducing signal in seeking are in positions equivalent to each other between two or more adjacent tracks, they are formed by connecting them to each other in a direction orthogonal to the tracks.

Further, the optical recording medium of the present invention is an optical recording medium in which land tracks and groove tracks each have different header information, and recording and/or reproduction is conducted in both the land tracks and the groove tracks, wherein when concave portions and/or convex portions constituting the reproducing signal in seeking are each in positions equivalent to each other between two or more adjacent tracks, they are formed by connecting them to each other in a direction orthogonal to the tracks.

Still further, the optical recording medium of the present invention is an optical recording medium in which a pair of land track and groove track adjacent to each other share header information, and recording and/or reproduction is conducted in both the land track and the groove track, wherein when concave portions and/or convex portions constituting the reproducing signal in seeking corresponding to a pair of land/groove tracks constituting a header region are each in positions equivalent to each other between two or more adjacent tracks, they are formed by connecting them to each other in a direction orthogonal to the tracks.

In these optical recording media, the concave portions and/or the convex portions constituting the reproducing signal in seeking may be ones meaning concave portions or convex portions constituting the timing signal for writing the header signal.

In these optical recording media, when the concave portions and/or the convex portions constituting the reproducing signal in seeking are each not in positions equivalent to each other between the tracks adjacent to each other, it is preferred that a boundary between the concave portions and the convex portions constituting the reproducing signal in seeking is rather on the side of the convex portions constituting the reproducing signal in seeking than a track boundary.

Further, a portion continuously formed by an edge of the connected concave portions and/or convex portions constituting the reproducing signal in seeking in positions equivalent to each other between two or more adjacent tracks, which edge is in a direction crossing the tracks, that is to say, an edge in a direction crossing the tracks of the connected concave portions and/or convex portions constituting the reproducing signal in seeking, is formed in an approximately linear shape approximately parallel to a direction orthogonal to the tracks as a whole, and that the degree of swelling thereof is not more than one third of the minimum recording unit. The degree of swelling is more preferably one fourth or less the minimum recording unit.

On the other hand, it is preferred that a portion continuously formed by an edge of the connected concave portions and/or convex portions constituting the reproducing signal in seeking in positions equivalent to each other between two or more adjacent tracks, which edge is in a direction crossing the tracks, that is to say, an edge in a direction crossing the tracks of the connected concave portions and/or convex portions constituting the reproducing signal in seeking, is formed in an arc shape along a locus of the moving optical head as a whole, and that the degree of swelling thereof is not more than one third of the minimum recording unit. The degree of swelling is more preferably one fourth or less the minimum recording unit.

A stamper used for manufacturing the optical recording medium of the present invention can be produced, for example, by a method for producing the stamper using a two-beam system mastering apparatus having a main beam for conducting irradiation for forming an unevenness pattern of a signal recorded on a substrate and a sub-beam for conducting irradiation for forming a guide groove. In the above method, concurrent irradiation of the sub-beam is conducted in synchronism with irradiation of a main beam for forming the concave portions constituting the reproducing signal in seeking. In this case, it is preferred that the sub-beam is irradiated in synchronism with irradiation of the main beam for forming the concave portions constituting the reproducing signal in seeking, with a delay of a specified period of time from the initiation of irradiation of the main beam, at an output pulse width shorter than that of the above-mentioned main beam.

Further, an increase in power of the main beam can widen the pit width of a header portion in a diameter direction to connect it to a pit on an adjacent track, only by the main beam without using the sub beam. According to the method using the sub-beam, the pit width can be widened only on one side of a pit resulting in deviation of a center of the pit in some times. In contrast, according to the method using only the main beam such a problem does not arise, and therefore this method is more preferred. However, an increase in power of the main beam results in an increase in length in a circumferential direction of a pit. Moreover, the influence thereof increases from an outer periphery toward an inner periphery. Accordingly, it is preferred that the pulse length of emitting a laser light in order to form a pit is changed according to the radial position. Further, for reducing the swelling of the edge of the connected pattern in a direction crossing the tracks, it preferred that a slit is inserted into the main beam, thereby controlling the beam diameter in a circumferential direction and the beam diameter in a diameter direction after the passage through an objective lens. Furthermore, for forming the edge of the connected pattern in a direction crossing the tracks as an arc shape corresponding to a locus of the moving optical head, it can be performed by gradually shifting the pit pulse output of a formatter according to a rotational synchronizing signal of a cutting apparatus. These techniques are similarly effective also when the convex portions or concave portions constituting the timing signal for writing the header signal.

Further, for making it possible to reproduce from pits in both tracking servo and seeking, an optical recording medium as described below can also be used.

That is to say, the optical recording medium comprises a track having a guide groove for tracking servo, and a region (header region) in which at least a signal for address reproduction is recorded by an unevenness pattern on the track, wherein the depth of the guide groove of the above-mentioned header region is formed so as to be shallower than the depth of concave portions (header signal concave portions) constituting the unevenness pattern of a signal (header signal) recorded in the header region, the header signal concave portions are formed penetrating through the above-mentioned guide groove, and convex portions (header signal convex portions) constituting the unevenness pattern of the header signal are each surrounded by the above-mentioned guide groove and the header signal concave portions thereby isolated.

In this case, the width in a direction orthogonal to the tracks of the header signal convex portions is preferably 50% or more of the beam diameter of a laser beam used for reproduction of recorded information, and it is preferred that the depth of the guide groove of the header region is 55 nm or less and the width in a direction orthogonal to the tracks of the header signal convex portions is 120 nm or more.

A stamper used for manufacturing the optical recording medium as described above can be produced, for example, by a method for producing the stamper using a two-beam system mastering apparatus having a main beam for conducting irradiation for forming an unevenness pattern of a signal recorded on a substrate and the sub-beam for conducting irradiation for forming the guide groove. In the above method, when irradiation for forming the guide groove with a sub-beam is conducted, irradiation for forming the guide groove of the header region should be conducted at an output of 0.5 time to 0.9 time that of irradiation for forming the guide groove of a region (data region) for recording data.

The present invention is described in more detail below.

In general, the header signals for address reproduction comprises an AGC (auto gain control) signal for controlling a gain controlled by a recording/reproduction apparatus depending on the intensity of a reproducing signal, a VFO (variable frequency oscillator) signal for controlling detection timing of the recording/reproduction apparatus depending on a signal, a CRC (cyclic redundancy check) signal for judging the right and wrong of the detected track number and sector number, and so on, as well as the track number and sector number which are address information of a sector. In the case of the pit format, these are previously formed as unevenness of the substrate, and in the case of the soft format, these are written later in the same manner as for data.

A conceptual illustration showing an unevenness pattern of a header region of conventional pit format is shown in FIG. 1. Referring to FIG. 1, the right and left direction indicates a circumferential direction, and a medium rotationally moves from right to left. In the figure, a black portion (for example, 101, excepting grooves described later) of a header region indicates a pit (concave portion), and a white portion (for example, 102) indicates a mark (convex portion). A black strip portion 103 continuing in a circumferential direction of the header region and a data recording region indicates a groove (guide groove), and a white strip portion 104 of the data recording region indicates a land. Vertical corrugated double lines indicate that the illustration is omitted (the same applies in FIGS. 7, 8 and 9). Further, 105 designates a track pitch, 106 a track width, 107 a track boundary, and 108 the minimum recording unit.

In the case of such an unevenness pattern arrangement, during the seek action in which a head moves between the tracks, the groove between the tracks and the discontinuity between the tracks of the unevenness pattern of a header exert an adverse effect, resulting in failure to obtain a good header reproducing signal. Further, in near-field optical recording employing the edge detection system, the length (for example, 110) in a diameter direction of the difference in level in a circumferential direction which a beam crosses is short even during tracking, resulting in failure to obtain a good reproducing signal.

When the circumferential arrangements of the unevenness patterns of the header signals of the adjacent tracks are compared between the tracks, the same signal is used as both of an AGC signal and a VFO signal in one recording medium, for example, as shown in FIG. 1. Accordingly, the signal is constituted by the same unevenness pattern arrangement on each track. Although the sector number is not necessarily required to be reproduced during seeking, it is constituted by the same pattern arrangement on each track, because of the same number in a radial direction. In these signals, therefore, pits and marks constituting the signals are all in positions equivalent to each other between the tracks.

On the other hand, the track number has a different numerical value for each track. However, when a gray code is used, the difference in the numerical value between the adjacent tracks is always 1. Accordingly, almost all unevenness arrangements constituting the unevenness patterns corresponding to the track numbers, particularly almost all unevenness arrangements indicating higher figures of the track numbers are the same arrangement on each track. Accordingly, almost all pits and marks constituting the track number are in positions equivalent to each other between the tracks.

Figure 2:
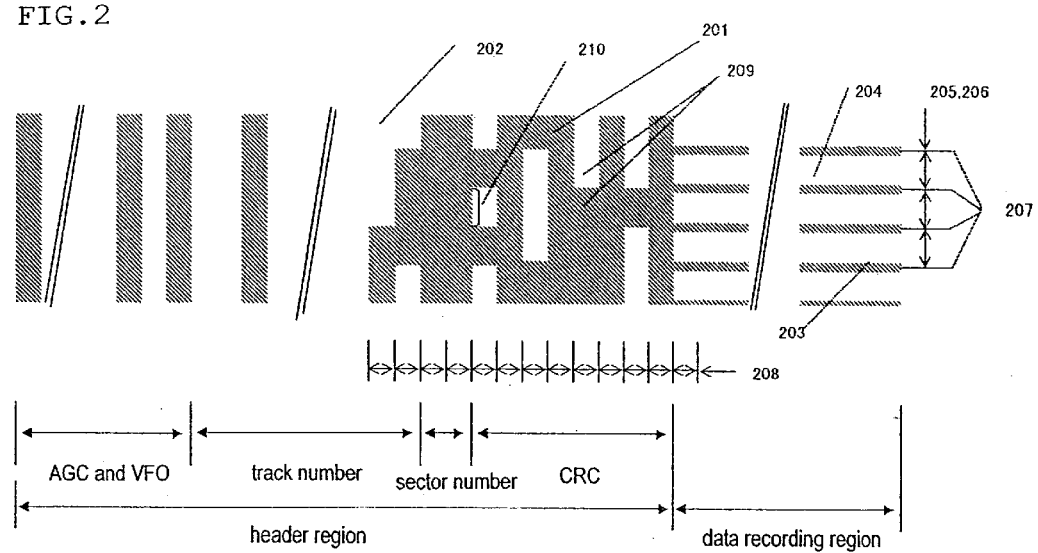
FIG. 2 is a conceptual illustration showing one example of an unevenness pattern of a header region of the present invention in land recording-pit format.

A conceptual illustration showing an example of an unevenness pattern of a header region in the present invention is shown in FIG. 2. Similarly to FIG. 1, the right and left direction indicates a circumferential direction, and a medium rotationally moves from right to left. A black portion (for example, 201) of a header region indicates a pit, and a white portion (for example, 202) indicates a mark. A black strip portion 203 continuing in a circumferential direction of a data recording region indicates a groove, and a white strip portion 204 of the data recording region indicates a land. In the present invention shown in FIG. 2, no groove (guide groove) is provided in the header region. Oblique double lines to the vertical direction indicate that the illustration is omitted. Further, 205 designates a track pitch, 206 a track width, 207 a track boundary, and 208 the minimum recording unit.

In FIG. 2, with respect to concave portions constituting an unevenness pattern corresponding to a reproducing signal in seeking reproduced when an optical head moves between tracks in recording/reproduction of the optical recording medium, the concave portions in positions equivalent to each other between two or more adjacent tracks are connected to each other (penetrating them) in a direction orthogonal to the tracks. Further, an edge approximately parallel to a direction orthogonal to the tracks of the connected concave portions is formed as a boundary between the concave portions and a portion where no concave is formed on the medium. On the other hand, with respect to convex portions, the convex portions in positions equivalent to each other between two or more adjacent tracks are also formed by connecting them to each other in a direction orthogonal to the tracks, and an edge approximately parallel to a direction orthogonal to the tracks of the connected convex portions is formed as a boundary between the convex portion and a portion where a concave is formed on the medium.

The term "in positions equivalent to each other between the adjacent tracks" as used herein means a state in which a pit is adjacent to a pit and a mark is adjacent to a mark existing on the tracks adjacent to each other, compared in the minimum recording unit.

As described above, the pits and marks constituting the AGC signal and the VFO signal are all in positions equivalent to each other between the tracks, and these are formed as the concave portions or the convex portions linearly connected in a longitudinal direction, as shown in a portion on the left side of FIG. 2. Almost all of the pits and marks constituting the track number are also in positions equivalent to each other between the tracks, and formed as the concave portions or the convex portions linearly connected in a longitudinal direction except for a part thereof, as shown in a portion from the center to the left of the figure. Further, as shown in a center portion of the figure, the same applies to the sector number. On the other hand, the pits and marks constituting a part of the track number and the CRC signal are not necessarily in equivalent positions between all tracks, so that they are not formed by connecting them across all tracks. However, as shown in a portion from the center to the right of the figure, ones in positions equivalent to each other are connected to form them.

Such formation makes it possible to detect almost all of these signals even during radial movement of the optical head, and it becomes possible to detect the AGC signal and the VFO signal, and to read the track number and the sector number, without conducting tracking servo during seeking of the optical head.

Further, in the near-field optical recording employing the edge detection system, particularly, a circumferential step portion (for example, 210) on which a beam crosses becomes wide to obtain a good reproducing signal even during tracking adjustment.

However, in the conventional cutting system, a circular beam is used for exposure of pit portions, so that the swelling 302 occurs in the connected portion (for example, 301) of the pattern connected between the tracks, as shown in FIG. 3. When the swelling 302 of the connected pattern is large, timing deviation sometimes occurs in the header signal between the adjacent tracks. Accordingly, concerning a straight line formed by an edge approximately parallel to a direction orthogonal to the tracks of the connected concave portions constituting the reproducing signal in seeking, the degree of swelling thereof is preferably not more than one third of the minimum recording unit.

Figure 4:
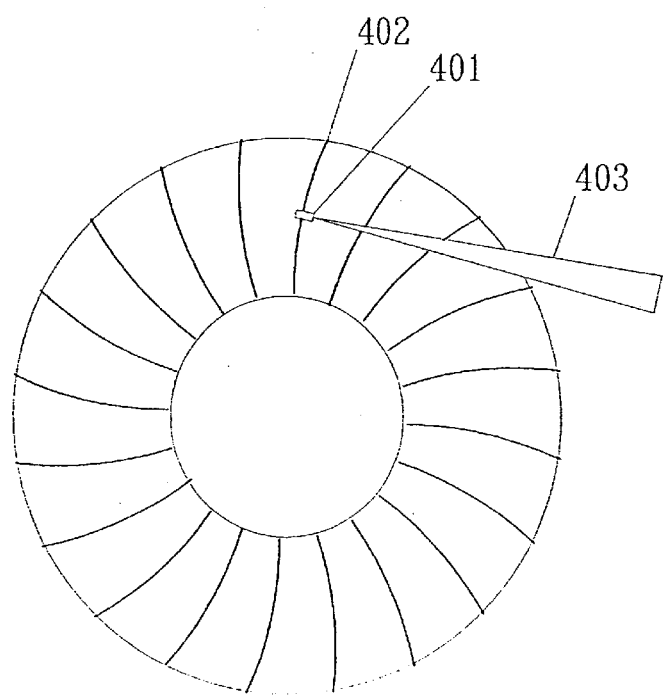
FIG. 4 is a conceptual illustration showing an arc-shaped header arrangement.

Further, as shown in FIG. 4, a circumferential position of an arm system head 401 on a disk varies in its radial position in an arc shape 402. Considering long-term continuous writing/reproduction, a linear radial header arrangement causes gradual deviation of the timing when a header comes under the head. For this reason, it is preferred that the circumferential position of the header is also in an arc shape 402 along a locus of the moving optical head.

Further, concerning the straight line formed by the edge approximately parallel to a direction orthogonal to the tracks of the connected convex portions constituting the reproducing signal in seeking, the degree of swelling thereof is also preferably not more than one third of the minimum recording unit, and an arc-shaped arrangement along a locus of the moving optical head is preferred.

As shown in FIG. 2, the optical recording medium of the present invention is, for example, an optical recording medium comprising a track having a guide groove for tracking servo, and a header region in which at least a signal for address reproduction is recorded by an unevenness pattern on a track, wherein no guide groove is provided in a header region, and at least one of a convex pattern or a concave pattern constituting a header signal continues from an inner periphery to an outer periphery in a diameter direction of the medium, or an optical recording medium in which a convex portion or a concave portion constituting a header signal has at least a plurality of convex patterns or concave patterns continuing across at least a plurality of tracks in a diameter direction of the medium, or an optical recording medium in which at least one convex pattern and one concave pattern constituting header signals, or at least a pair of convex pattern and concave pattern continue from an inner periphery to an outer periphery in a diameter direction of the medium. In FIG. 2, these convex pattern and concave pattern are formed in a linear shape as a whole. However, they may be formed in an arc shape along a locus of the moving optical head as a whole.

Figure 5:
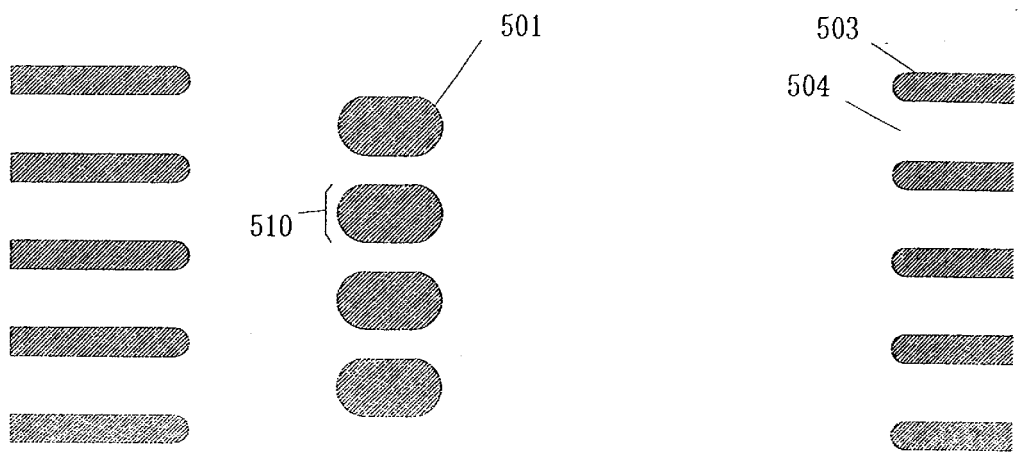
FIG. 5 is a conceptual illustration showing an unevenness pattern of a conventional header region in land recording-soft format.

On the other hand, a conceptual illustration showing an unevenness pattern of a header region in the conventional soft format is shown in FIG. 5. In FIG. 5, 501 designates a timing pit for generating a timing signal, and a header signal is written in a white portion on the right side thereof. The right and left direction indicates a circumferential direction, and a medium rotationally moves from right to left. Further, a black strip portion 503 continuing in a circumferential direction indicates a groove, and 504 indicates a land for recording data. Using this timing pit as a trigger, the header signal is written with a header writing unit in the same manner as for data. In near-field optical recording employing the edge detection system, the length (for example, 510) in a diameter direction of the difference in level in a circumferential direction on which a beam crosses is short even during tracking adjustment, resulting in failure to obtain a good reproducing signal.

Figure 6:
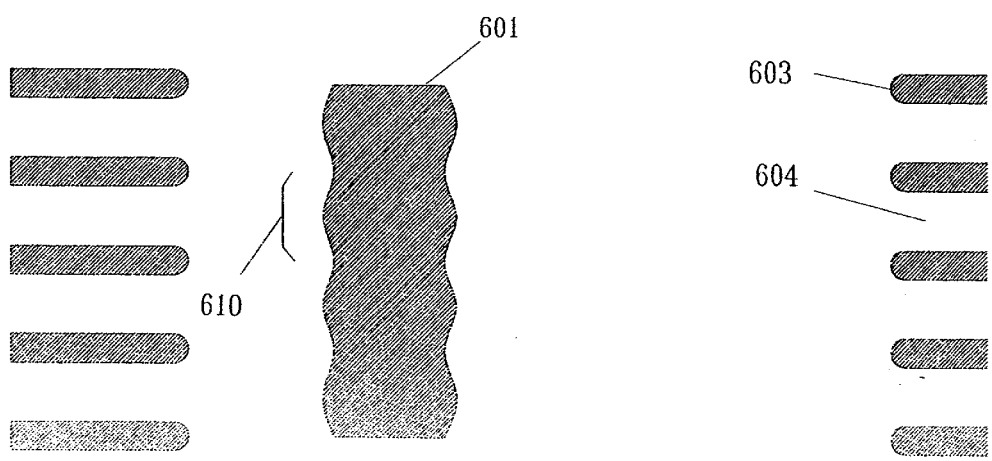
FIG. 6 is a conceptual illustration showing one example of an unevenness pattern of a header region of the present invention in land recording-soft format.

In FIG. 6, a conceptual illustration showing one example of an unevenness pattern of a header region in the soft format of the present invention is shown. In the figure, 601 designates a timing pit for generating a timing signal, and a header signal is written in a white portion on the right side thereof. The right and left direction indicates a circumferential direction, and a medium rotationally moves from right to left. Further, a black strip portion 603 continuing in a circumferential direction indicates a groove, and 604 indicates a land for recording data. In this figure, concave portions constituting a timing signal are formed by connecting them across a plurality of tracks from an inner periphery to an outer periphery in a diameter direction of the medium. This figure is the case of land recording. However, in the case of groove recording, convex portions for generating a timing signal are formed by connecting them across a plurality of tracks. The unevenness pattern for generating the timing signal may be an unevenness pattern in which concave portions and convex portions are combined in a circumferential direction, and may be formed by connecting at least one part of the concave portions or convex portions constituting that unevenness pattern across a plurality of tracks.

In this case, the length (for example, 610) in a diameter direction of the difference in level in a circumferential direction on which a beam crosses, of the unevenness pattern constituting the timing signal is increased to give a good reproducing signal.

However, similarly to the pit format, in the conventional cutting system, a circular beam is used for exposure of pit portions, so that the swelling occurs in the connected portion of the pattern connected between the tracks, as shown in FIG. 6. When the swelling of the connected pattern is large, timing deviation occurs in writing the header signal. As a result, timing deviation sometimes occurs between the adjacent tracks. Accordingly, concerning an edge approximately parallel to a direction orthogonal to the tracks of the connected convex portions or concave portions constituting the timing signal for writing the header signal, the degree of swelling thereof is more preferably not more than one third of the minimum recording unit.

Further, also in the case of the soft format, the circumferential position of the header is more preferably in an arc shape along a locus of the moving optical head, similarly to the pit format.

Although land recording in which data is recorded and/or reproduced on lands is described above by way of example, the same applies in the case of groove recording, from the scope of the present invention.

For the case of land/groove recording in which data is recorded and/or reproduced on both lands and grooves, the present invention is described in detail below.

Figure 7:
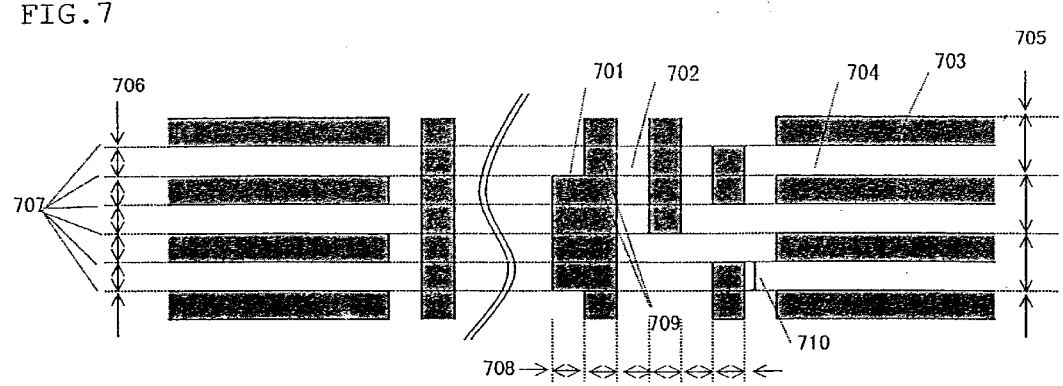
FIG. 7 is a conceptual illustration showing one example of an unevenness pattern of a header region of the present invention in the case of land/groove recording in which a land track and a groove track each have different header patterns.

In FIG. 7 is shown a conceptual illustration showing one example of an unevenness pattern of a part of a header region in the case where a gray code is formed according to the present invention. In this figure, a land track and a groove track each have different header information (unevenness patterns). The right and left direction indicates a circumferential direction, and a medium rotationally moves from right to left. In the figure, a black portion (for example, 701) of a header region indicates a pit (concave portion), and a white portion (for example, 702) indicates a mark (convex portion). A black strip portion 703 continuing in a circumferential direction of a data recording region indicates a groove, and a white strip portion 704 indicates a land. Further, 705 designates a track pitch, 706 a track width, 707 a track boundary, and 708 the minimum recording unit. In this figure, grooves are formed in the data recording region and not formed in the header region. The same applies in FIGS. 8 and 9 described later.

When circumferential arrangements of the unevenness patterns of the header signals of the tracks adjacent to each other are compared between the tracks, as shown in the figure, in the case when the gray code is used, almost all unevenness arrangements constituting the header signals are the same on each track, because the difference in the circumferential unevenness arrangements is always one minimum recording unit between the adjacent tracks.

In the case of header constitution of the present invention, with respect to a header signal which is necessarily reproduced during seeking, the difference in the circumferential unevenness arrangements is one minimum recording unit between the adjacent tracks, so that the reading error of the track number is ±1. Moreover, the frequency of occurrence thereof is low (it occurs only when the optical head crosses the difference point between the tracks). Accordingly, seeking a desired track becomes possible without repetition of tracking servo and header reproduction.

Further, in the near-field optical recording employing the edge detection system, particularly, a circumferential step portion (for example, 710) on which a beam crosses becomes wide to obtain a good reproducing signal even during tracking adjustment.

However, in the conventional cutting system, a circular beam is used for exposure of pit portions, so that the swelling 302 occurs in the connected portion (for example, 301) of the pattern connected between the tracks, as shown in FIG. 3. When the swelling 302 of the connected pattern is large, timing deviation sometimes occurs in the header signal between the adjacent tracks. Accordingly, concerning an edge approximately parallel to a direction orthogonal to the tracks of concave portions or convex portions constituting the reproducing signal in seeking, the degree of swelling thereof is preferably not more than one third of the minimum recording unit.

Further, as shown in FIG. 4, a circumferential position of an arm system head 401 on a disk varies in its radial position in an arc shape 402. Considering long-term continuous writing/reproduction, a linear radial header arrangement causes gradual deviation of the timing when a header comes under the head. For this reason, it is preferred that the circumferential position of the header is also in an arc shape 402 along a locus of the moving optical head.

Figure 8:
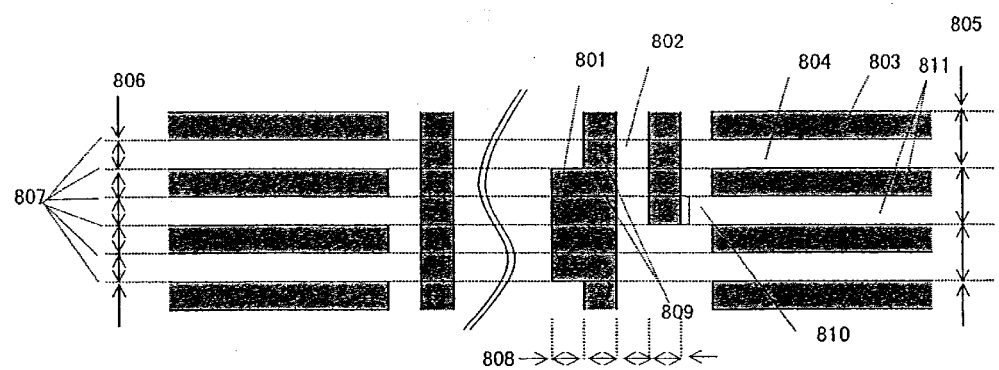
FIG. 8 is a conceptual illustration showing one example of an unevenness pattern of a header region of the present invention in the case of land/groove recording in which a land track and a groove track each share a header pattern.

In FIG. 8 is shown a conceptual illustration showing another example of an unevenness pattern of a part of a header region in the case where a gray code is formed according to the present invention. In this figure, a pair of land track and groove track designated by reference numeral 811 share the same header information (unevenness pattern). That is to say, the header information recorded is the same in the header regions of a pair of land track and groove track. When circumferential arrangements of the unevenness patterns of the header signals shared by a pair of land track and groove track are compared to these of each pair of adjacent tracks, as shown in the figure, in the case when the gray code is used, almost all unevenness arrangements constituting the header signals are the same on each track, because the difference in the circumferential unevenness arrangements is always one minimum recording unit between the adjacent tracks.

In the case of header constitution of the present invention, with respect to a header signal which is necessarily reproduced during seeking, the difference in the unevenness patterns between each pair of tracks adjacent to each other is one minimum recording unit, so that the reading error of the track number is ±1. Moreover, the frequency of occurrence thereof is low (it occurs only when the optical head crosses the difference point between a pair of tracks). Accordingly, seeking a desired track becomes possible without repetition of tracking servo and header reproduction.

Further, in the near-field optical recording employing the edge detection system, a circumferential step portion (for example, 810) on which a beam crosses becomes wide to obtain a good reproducing signal even during tracking adjustment.

However, in the conventional cutting system, a circular beam is used for exposure of pit portions, so that the swelling 302 occurs in the connected portion (for example, 301) of the pattern connected between the tracks, as shown in FIG. 3. When the swelling 302 of the connected pattern is large, timing deviation sometimes occurs in the header signal between the adjacent tracks. Accordingly, concerning an edge approximately parallel to a direction orthogonal to the tracks of concave portions or convex portions constituting the reproducing signal in seeking, or the concave portions or convex portions constituting the timing signal, the degree of swelling thereof is preferably not more than one third of the minimum recording unit.

Further, as shown in FIG. 4, a circumferential position of an arm system head 401 on a disk varies in its radial position in an arc shape 402. Considering long-term continuous writing/reproduction, a linear radial header arrangement causes gradual deviation of the timing when a header comes under the head. For this reason, it is preferred that the circumferential position of the header is also in an arc shape 402 along a locus of the moving optical head.

Furthermore, considering the cross talk between the tracks at the time when the track pitch becomes narrow, it is preferred that a boundary between the convex portions and the concave portions is rather on the side of the convex portions than a track boundary (that is to say, the width of the convex portions is narrower than that of the concave portions).

Figure 9:
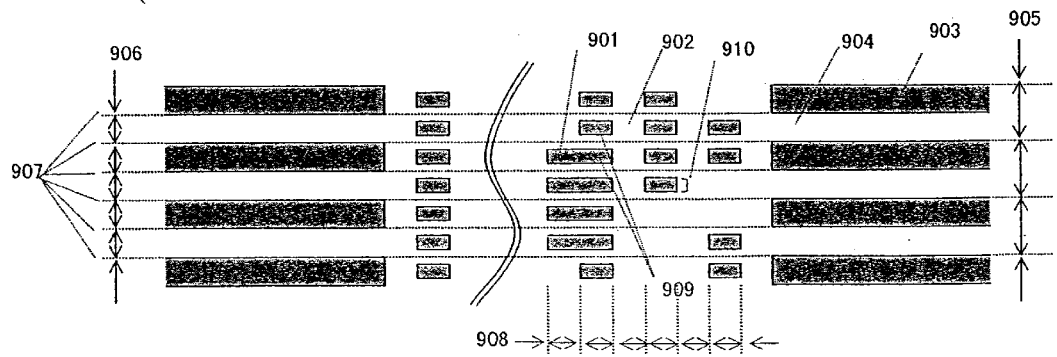
FIG. 9 is a conceptual illustration showing an unevenness pattern of a conventional header region in land/groove recording in which a land track and a groove track each have different header patterns.

A part of conventional header constitution is shown in FIG. 9. In this case, with respect to a header signal which is necessarily reproduced during seeking, when a head is positioned at a boundary between the tracks, a reproducing signal of good quality is not obtained and seeking is difficult.

Figure 10:
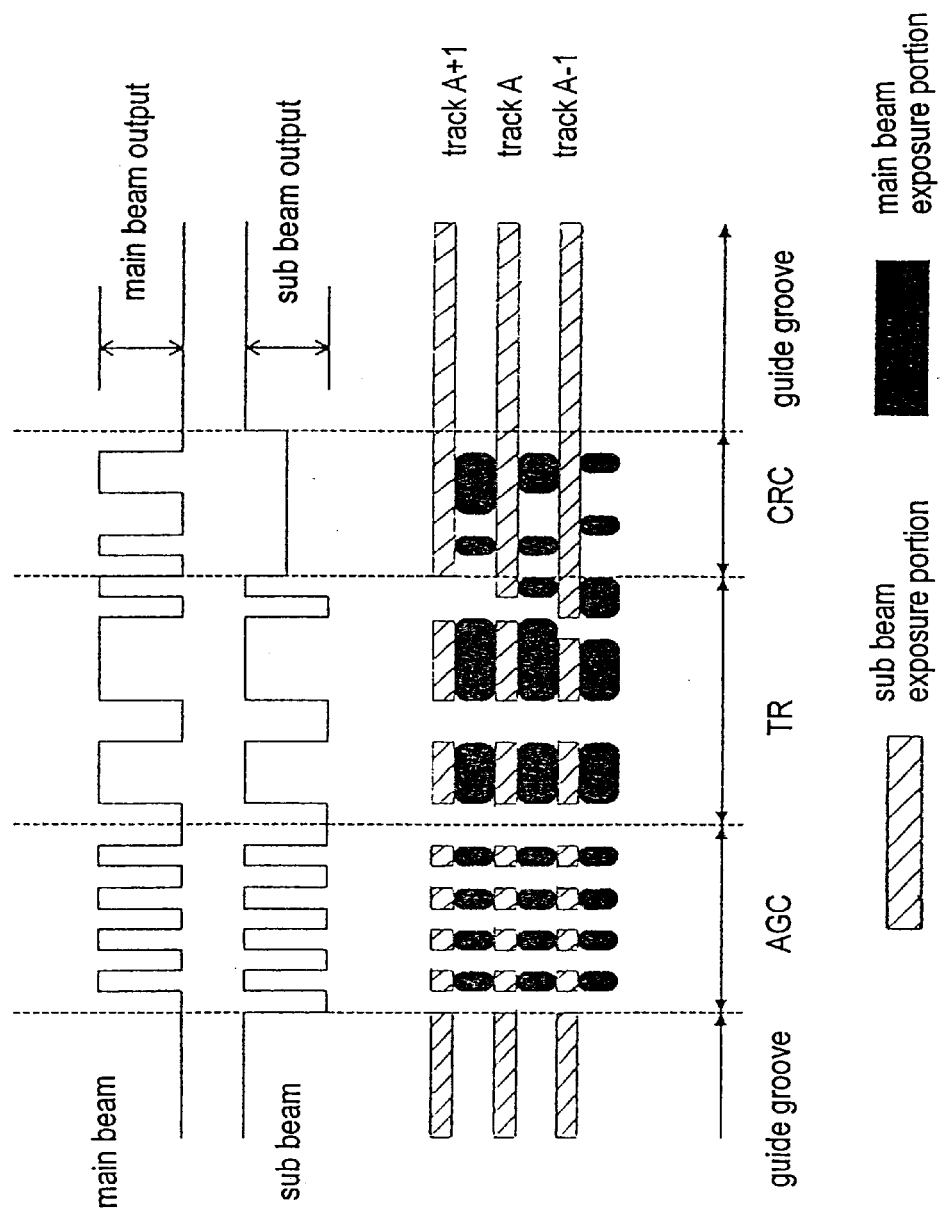
FIG. 10 is a view showing one example of a header pattern of the present invention prepared by a 2-beam process.
Figure 11:
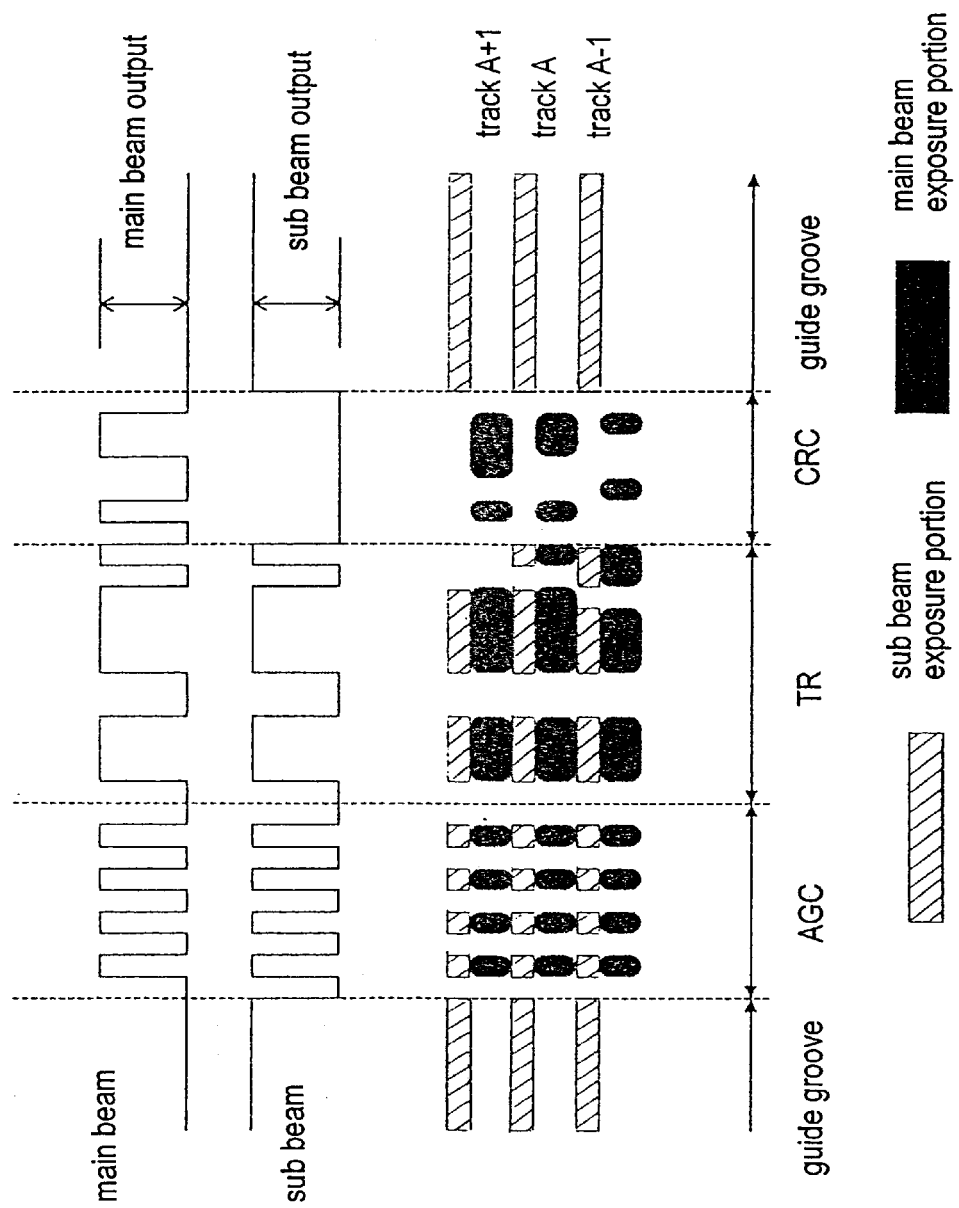
FIG. 11 is a view showing another example of a header pattern of the present invention prepared by a 2-beam process.
Figure 12:
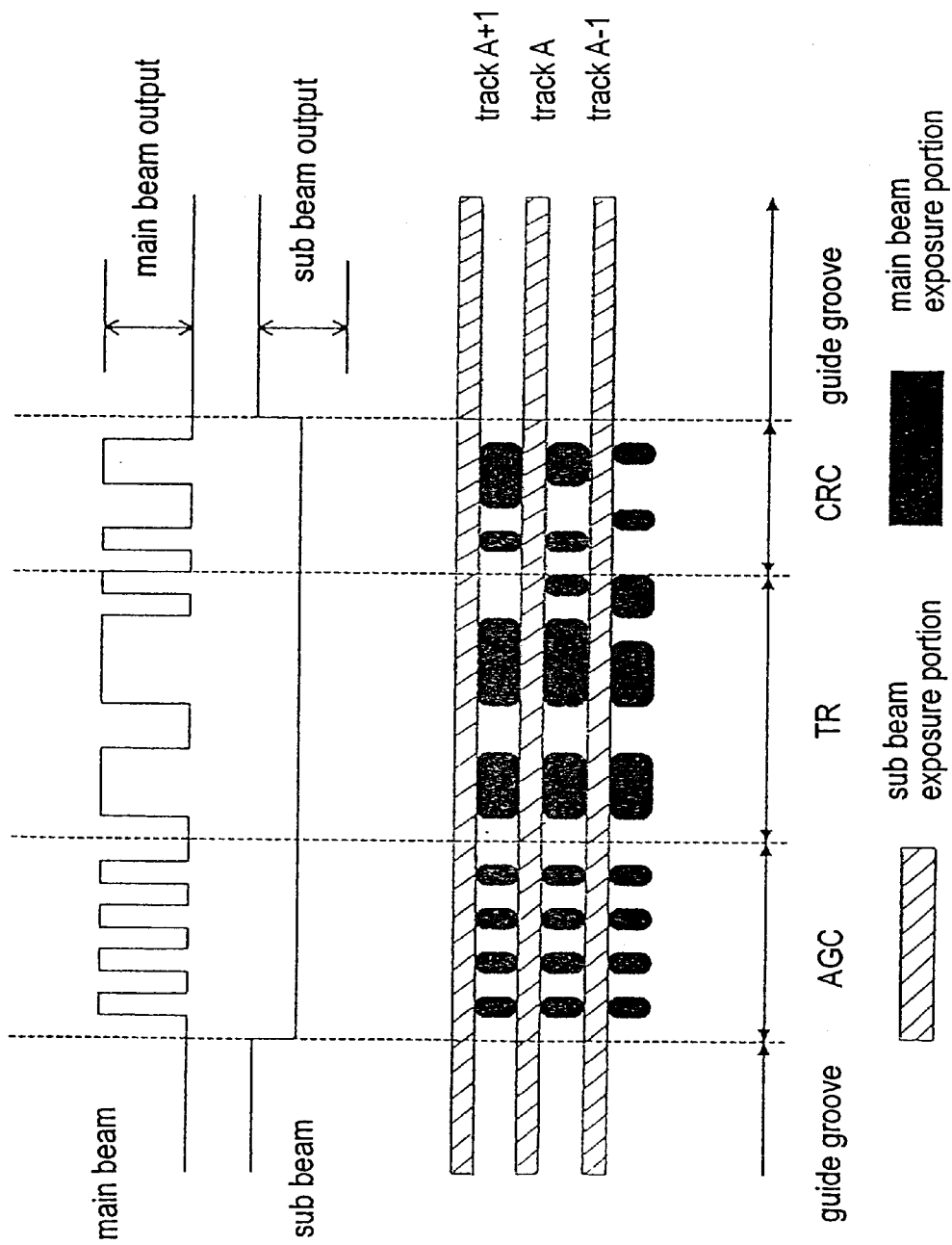
FIG. 12 is a view showing one example of a header pattern in which guide grooves are also formed in a header region.

Further, the case is described according to FIGS. 10 to 12, where a mastering apparatus of the two-beam system of forming an unevenness pattern constituting a header signal with a main beam and forming a guide groove with a sub beam is used.

The lower halves of these figures schematically show the shapes of pits (concave portions) and guide grooves formed, and the upper halves thereof schematically show beam outputs of main beams and sub beams in exposure (in the figures, only three tracks are shown for simplicity). White portions indicate lands, convex portions as substrates, and portions painted out black or shaded portions indicate the pits or the guide grooves, concave portions as substrates. The pits, the portions painted out black, are formed with the main beam, and the guide grooves, the shaded portions, are exposed with the sub beam. A portion having AGC and VFO functions in combination (hereinafter referred to as an AGC portion) has a fixed pattern, so that it is in a state in which pits are radially connected to one another. A portion in which the track number and the sector number are recorded (hereinafter referred to as a TR portion) is different in pattern between the adjacent tracks, so that pits exist not in a state in which pits are radially connected to one another.

As shown in FIGS. 10 and 11, the guide grooves formed with the sub beam of the AGC portion and the TR portion is formed so as to have the same pattern as that of the pits formed with the main beam, which causes a boundary between the pits and the lands approximately parallel to a radial direction in the AGC portion and almost all of the TR potion to be radially continuous.

In this case, according to the relationship between the output intensity and timing of the main beam and the sub beam, the configuration of the boundary between the pits and the lands continuing in a radial direction becomes winding, and exerts an influence on the jitter value of a reproducing signal.

For example, when the output timing and pulse width of the main beam and the sub beam are made identical to each other, exposure proceeds on an extended line of the sub beam by overlap of sub beam exposure with main beam exposure, resulting in a winding boundary between the pits and the lands approximately parallel to a radial direction. Conversely, when the pulse width of the sub beam is shortened to the output pulse of the main beam, exposure by overlap of the sub beam with the main beam at end portions does not proceed because of the short sub beam, resulting in such a winding boundary that the pits are constricted. Such a constricted shape is also similarly formed when the output thereof is increased only by the main beam without conducting exposure with the sub beam. Accordingly, the boundary approximately parallel to a radial direction can be straightened and the jitter value of the reproducing signal can be reduced by optimizing the relationship between the output intensity and timing of the main beam and these of the sub beam, for example, suitably controlling the width of the output pulse of the sub beam.

When the AGC portion and the TR portion are formed as described above, the guide grooves by the sub beam may be either formed or not as shown in FIG. 11 for the CRC portion. When the grooves are formed, it is preferred that the exposure amount for forming the guide grooves of the CRC portion is smaller than the exposure amount for forming the guide grooves of the data region, as shown in FIG. 10.

Further, when the continuous grooves are also formed in the header region as shown in FIG. 12, the influence of diffraction light caused by the difference in level on a boundary parallel to a track direction between the pits or the convex portions (lands) and the guide grooves can be removed by allowing the pits to penetrate the guide grooves, forming each of the header signal convex portions so that it is surrounded by the guide grooves and the header signal concave portions thereby isolated, and forming the guide grooves of the header region having a depth shallower than the header signal concave portions.

In this case, an end portion of the main beam overlaps with the sub beam to perform exposure, so that an end portion of the header signal convex portions in a track direction is tapered off in some cases. As a result, the amplitude of a signal detected is decreased, and the length of a signal corresponding to the pits is lengthened and the length of a signal corresponding to the convex portions (lands) is shortened, sometimes resulting in deviation of the length ratio of the signals to be reproduced. This influence can be reduced by optimally adjusting the dose of the sub beam corresponding to the dose of the main beam.

Figure 13:
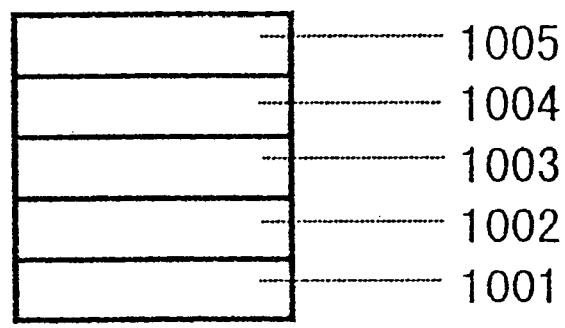
FIG. 13 is a partial cross-sectional view showing an optical recording medium embodying the present invention.

The medium structure of the optical recording media of the present invention is described below. A partial cross-sectional view showing an optical recording medium embodying the present invention is shown in FIG. 13. A substrate 1001 is laminated with a reflective layer 1002, a recording layer 1003, a protective layer 1004 and a liquid lubricating layer 1005.

There is no particular limitation on the substrate 1001, as long as it satisfies the characteristics required for a medium substrate, such as mechanical characteristics, and glass, polycarbonates, amorphous polyolefins, engineering plastics and so on can be used. The header pattern of the present invention can be formed by preparing a stamper formed of Ni or the like by electroforming from an original disk obtained by exposing a resist original disk to a laser beam according to the output of the formatter which generates a pattern forming signal, and then preparing the above-mentioned resin-made substrate by injection molding or ultraviolet curing based on the stamper. In the case of glass, it can be prepared by the 2P process using an ultraviolet curing resin.

A material high in reflectance at a laser wavelength used, such as a noble metal, Cu, Al or the like, is used in the reflective layer 1002. Further, alloys of these metals or alloys of other metals may be used in the reflective layers for securing durability. Furthermore, when the thickness of the recording layer 1003 is sufficiently thick, the reflective layer 1002 may be omitted. An intermediate dielectric layer composed of AlN, SiN, GeN, $Ta_2O_5$, $ZnS$—$SiO_2$ or the like may be provided between the recording layer 1003 and the reflective layer 1004.

In the case of magneto-optical recording, the recording layer 1003 is formed of an amorphous rear earth transition metal film highly anisotropic in vertical magnetism, such as TbFeCo, TbDyFeCo, NdDyFeCo or the like, or an artificial lattice film such as Pt/Co. The thickness of the recording layer 1003 is preferably from 10 nm to 200 nm. When the recording layer is a monolayer, the thickness of the recording layer 1003 is more preferably from 15 nm to 40 nm, in consideration of SNR. The recording layer 1003 is not necessarily required to be a monolayer, and may be a laminate with a layer for enhancing recording magnetic field sensitivity such as GdFeCo, or a laminate with an intermediate layer of magnetic super resolution or a reproducing layer.

To the recording layer 1003 used herein, an anti-corrosion element such as Cr, Ti, Zr, Nb, Ta or the like may be added for enhancing corrosion resistance, or several atomic % of Nd may be added for increasing a Carr rotational angle at a shorter wavelength.

Further, in the case of phase-change recording, the recording layer 1003 is composed of a material in which the optical constant varies between crystalline and amorphous states, such as GeSbTe, AgInSbTe or the like. The thickness of the recording layer 1003 is preferably from 10 nm to 40 nm.

Furthermore, in the case of write once recording (additional write type), the recording layer 1003 is formed of a dye film such as cyanine, phthalocyanine, naphthalocyanine or the like, which can be formed by spin coating or the like.

The transparent protective layer 1004 composed of AlN, SiN, GeN, $Ta_2O_5$, $ZnS$—$SiO_2$ or a resin rather high in hardness is formed on the recording layer 1003. The thickness of the protective layer 1004 is set to such a thickness that a signal output from a recorded mark is increased, namely the range of about 10 nm to 1,000 nm. In the case of write once recording, however, functions can be carried out without the protective layer 1004. However, it is preferred that the recording layer 1003 is coated with a material harder than that of the recording layer 1003 for protecting the recording layer 1003 when a head is floated up.

The protective layer 1004 may be a multiple layer. For example, a layer excellent in hardness and self lubricity such as DLC may be formed on SiN. Here, the DLC layer is constituted by adding hydrogen and/or nitrogen to carbon.

A liquid lubricating layer 1005 is composed of a lubricant such as a perfluoropolyether, silicone oil or the like, and can be applied to the momentary contact of the head with the medium, which is feared in a system provided with the floating head. The thickness of the liquid lubricating layer 1005 is preferably from 0.2 nm to 4 nm.

An overcoat layer composed of an acrylic photo-curing resin or the like may be provided between the protective layer 1004 and the liquid lubricating layer 1005. In this case, the liquid lubricating layer is dispensable.

EXAMPLES

Specific embodiments to which the present invention is applied are described below. It needs scarcely be said that the present invention is not limited to the following examples, and that any changes can be made without departing from the spirit of the invention.

Example 1

An original disk coated with a resist to a thickness of 60 nm was exposed with a laser cutting device, thereby forming a pit format type unevenness pattern having header information as shown in FIG. 2, and further, a stamper formed of Ni was prepared by electroforming. Here, the track pitch was set to 450 nm, and the track width was set to 450 nm. The arrangement of a header pattern in a diameter direction in this case was linear. The degree of swelling was from 170 to 200 nm, and the maximum value thereof was 0.53 in the ratio to a minimum recording unit of 380 nm.

Then, using these stampers, a substrate 1001 made of a polycarbonate was prepared by injection molding. A magneto-optical recording film as shown in FIG. 13 was formed thereon in the following manner. A reflective layer 1002 composed of AgPdCu was formed on the substrate 1001 to a thickness of 30 nm by DC sputtering. A recording layer 1003 composed of TbFeCo was formed thereon to a thickness of 20 nm by DC sputtering. An SiN layer was further formed thereon to a thickness of 230 nm by reactive DC sputtering using an Si target in a mixed atmosphere of Ar and $N_2$, and a DLC layer was still further formed thereon to a thickness of 10 nm by reactive DC spattering using a C target in a mixed atmosphere of Ar and $H_2$. The SiN layer and the DLC layer were used as a protective layer 1004. Then, a perfluoropolyether liquid lubricating layer 1005 having a thickness of 1 nm was formed thereon by a pulling method to complete a magneto-optical recording medium.

Example 2

A magneto-optical recording medium was prepared in the same manner as Example 1 with the exception that the degree of swelling was changed to in the range of 50 to 80 nm, that is to say, the maximum value thereof was changed to 0.21 in the ratio to a minimum recording unit of 380 nm, by adjusting the laser beam in cutting.

Example 3

A magneto-optical recording medium was prepared in the same manner as Example 2 with the exception that the arrangement of the header in a diameter direction was changed to an arc shape.

Comparative Example 1

A magneto-optical recording medium was prepared in the same manner as Example 1 with the exception that an unevenness pattern in which pits were isolated as shown in FIG. 1 was used.

Example 4

An original disk coated with a resist to a thickness of 60 nm was exposed with a laser cutting device, thereby forming a soft format type stamper as shown in FIG. 6, and further, a stamper formed of Ni was prepared by electroforming. Here, the track pitch was set to 450 nm, and the track width was set to 450 nm. The arrangement of timing pits in a diameter direction in this case was linear. The degree of swelling was from 165 to 205 nm, and the maximum value thereof was 0.54 in the ratio to a minimum recording unit of 380 nm.

Then, using these stampers, a magneto-optical recording medium was prepared in the same manner as Example 1.

Example 5

A magneto-optical recording medium was prepared in the same manner as Example 4 with the exception that the degree of swelling was changed to in the range of 50 to 95 nm, that is to say, the maximum value thereof was changed to 0.25 in the ratio to a minimum recording unit of 380 nm, by adjusting the laser beam in cutting.

Example 6

A magneto-optical recording medium was prepared in the same manner as Example 5 with the exception that the arrangement of the timing pits in a diameter direction was changed to an arc shape.

Comparative Example 2

A magneto-optical recording medium was prepared in the same manner as Example 4 with the exception that isolated timing pits as shown in FIG. 5 were used.

Example 7

An original disk coated with a resist to a thickness of 60 nm was exposed with a laser cutting device, thereby forming an unevenness pattern in which a land track and a groove track each have different header information as shown in FIG. 7, and further, a stamper formed of Ni was prepared by electroforming. Here, the track pitch was set to 800 nm, and the track width was set to 400 nm. The arrangement of a header pattern in a diameter direction in this case was linear. The degree of swelling was from 170 to 190 nm, and the maximum value thereof was 0.5 in the ratio to a minimum recording unit of 380 nm.

Then, using these stampers, a magneto-optical recording medium was prepared in the same manner as Example 1.

Example 8

A magneto-optical recording medium was prepared in the same manner as Example 7 with the exception that the degree of swelling was changed to in the range of 45 to 90 nm, that is to say, the maximum value thereof was changed to 0.24 in the ratio to a minimum recording unit of 380 nm, by adjusting the laser beam in cutting.

Example 9

A magneto-optical recording medium was prepared in the same manner as Example 8 with the exception that the arrangement of the header in a diameter direction was changed to an arc shape.

Comparative Example 3

A magneto-optical recording medium was prepared in the same manner as Example 7 with the exception that an unevenness pattern comprising isolated pits as shown in FIG. 9 were used.

Example 10

An original disk coated with a resist to a thickness of 60 nm was exposed with a laser cutting device, thereby forming an unevenness pattern in which a land track and a groove track share header information as shown in FIG. 8, and further, a stamper formed of Ni was prepared by electroforming. Here, the track pitch was set to 800 nm, and the track width was set to 400 nm. The arrangement of a header pattern in a diameter direction in this case was linear. The degree of swelling was from 160 to 200 nm, and the maximum value thereof was 0.53 in the ratio to a minimum recording unit of 380 nm.

Then, using these stampers, a magneto-optical recording medium was prepared in the same manner as Example 1.

Example 11

A magneto-optical recording medium was prepared in the same manner as Example 10 with the exception that the degree of swelling was changed to in the range of 50 to 90 nm, that is to say, the maximum value thereof was changed to 0.24 in the ratio to a minimum recording unit of 380 nm, by adjusting the laser beam in cutting.

Example 12

A magneto-optical recording medium was prepared in the same manner as Example 11 with the exception that the arrangement of the header in a diameter direction was changed to an arc shape.

Example 13

A magneto-optical recording medium was prepared in the same manner as Example 12 with the exception that the track pitch was set to 700 nm, the track width was set to 350 nm, and a boundary between a concave pattern and a convex pattern is formed so as to protrude from a track boundary into the convex pattern side by 70 nm.

Example 14

A reflective layer 1002 composed of AlCr was formed on the same substrate 1001 used in Example 1 to a thickness of 40 nm by DC spattering. After a dielectric layer composed of ZnS—SiO$_2$ was formed thereon to a thickness of 30 nm by RF spattering, a recording layer 1003 composed of GeSbTe was formed to a thickness of 20 nm by DC spattering. A ZnS—SiO$_2$ layer was further formed thereon to a thickness of 150 nm by RF spattering, and a SiO$_2$ layer was still further formed thereon to a thickness of 200 nm by RF spattering. The ZnS—SiO$_2$ layer and the SiO$_2$ layer were used as a protective layer 1004. Then, a perfluoro-polyether liquid lubricating layer 1005 having a thickness of 1 nm was formed thereon by a pulling method to complete an optical recording medium.

For the optical recording media of Examples 1 to 14 and Comparative Examples 1 to 3, the media were rotated at a linear speed of 10 m/s, a slider SIL head having a laser wavelength of 685 nm and an effective numerical aperture of 1.3 was floated up to a height of 80 nm over the thin film surface of the medium, and the reproduced waveform output of header portions in crossing tracks was measured with an oscilloscope. Further, a seek operation was executed with a high-speed seek drive (a drive for reproducing header information during seeking and specifying a position) having equal functions. Furthermore, the reading error rate of header information in tracking was measured. Results of evaluation are summarized and shown in Tables 1 to 4. In the case of the soft format type, the measurements were made after ID information was written with an ID writing device.

TABLE 1

|  | Example 1 | Example 2 | Example 3 | Comparative Example 1 |
|---|---|---|---|---|
| Header Signal Voltage (mV) | 60 | 65 | 63 | 5.2 |
| Seek Operation | ○ | ○ | ○ | x |
| ID Error Rate | $1.1 \times 10^{-4}$ | $1 \times 10^{-5}$ | $1.2 \times 10^{-5}$ | Immeasurable |

TABLE 2

|  | Example 4 | Example 5 | Example 6 | Comparative Example 2 |
|---|---|---|---|---|
| Header Signal Voltage (mV) | 54 | 60 | 60 | 55 |
| Seek Operation | ○ | ○ | ○ | x |
| ID Error Rate | $1.1 \times 10^{-4}$ | $1 \times 10^{-5}$ | $1.2 \times 10^{-5}$ | Immeasurable |

TABLE 3

|  | Example 7 | Example 8 | Example 9 | Comparative Example 3 |
|---|---|---|---|---|
| Header Signal Voltage (mV) | 50 | 55 | 55 | 5.0 |
| Seek Operation | ○ | ○ | ○ | x |
| ID Error Rate | $1.5 \times 10^{-4}$ | $1.3 \times 10^{-5}$ | $1.4 \times 10^{-5}$ | Immeasurable |

TABLE 4

|  | Example 10 | Example 11 | Example 12 | Example 13 | Example 14 |
|---|---|---|---|---|---|
| Header Signal Voltage (mV) | 92 | 90 | 92 | 75 | 44 |
| Seek Operation | ○ | ○ | ○ | ○ | ○ |
| ID Error Rate | $7.2 \times 10^{-5}$ | $8.6 \times 10^{-6}$ | $7.9 \times 10^{-6}$ | $9.5 \times 10^{-5}$ | $2.0 \times 10^{-4}$ |

In the tables, ○ indicates that the seek operation with the drive is possible, and X indicates that the seek operation is impossible.

In the land recording of pit format type magneto-optical recording media, in the case of Examples 1 to 3, the header reproducing signal in crossing the tracks was good, and the seek operation with the drive was also possible. Further, the ID error rate was also good. In Comparative Example 1, the header reproducing signal in crossing the tracks was weak, and the seek operation with the drive was also impossible. Further, the ID error rate could not be measured.

In the land recording of soft format type magneto-optical recording media, in the case of Examples 4 to 6, the header reproducing signal in crossing the tracks was good, and the seek operation with the drive was also possible. Further, the ID error rate was also good. In Comparative Example 2, although the header reproducing signal in crossing the tracks was strong, the seek operation with the drive was impossible. Further, the ID error rate could not be measured.

In the magneto-optical recording media of land/groove recording in which the land track and the groove track had different header information, in the case of Examples 7 to 9, the header reproducing signal in crossing the tracks was good, and the seek operation with the drive was also possible. Further, the ID error rate was also good. In Comparative Example 3, the header reproducing signal in crossing the tracks was weak, and the seek operation with the drive was also impossible. Further, the ID error rate could not be measured.

In the magneto-optical recording media of land/groove recording in which the land track and the groove track shared the same header information, in the case of Examples 10 to 13, the header reproducing signal in crossing the tracks was good, and the seek operation with the drive was also possible. Further, the ID error rate was also good.

In the land recording of pit format type phase-change optical recording media, in the case of Example 14, the header reproducing signal in crossing the tracks was good, and the seek operation with the drive was also possible. Further, the ID error rate was also good.

Comparative Example 4

A photoresist original disk in which a positive type photoresist (TSMR-8900D, manufactured by TOKYO OHKA KOGYO CO., LTD.) was applied onto a glass disk having a diameter of 200 mm to a thickness of 85 nm was exposed from a radius of 30 mm to a radius of 60 mm at a revolution of the photoresist original disk of 750 rpm at a track pitch of 425 nm. The shortest pulse width of a modulated waveform shown in FIG. 14 was set to 240 ns. In this case, the length of formed pits in a circumferential direction and the length of a portion having no pit were 565 nm at a radius of 30 mm. In this case, the main beam output and the sub beam output were set, taking a value at a radius of 30 mm as a reference (P30), and controlled so that the outputs varied in proportion to the radius (R) (Output at a radius of R mm P30×R/30). The pit aperture diameter and the guide groove aperture diameter became constant over the whole exposed area by this output control.

Set values of the outputs of the main beam and the sub beam are shown in Table 5.

TABLE 5

| Main Beam Output at a Radius of 30 mm (mW) | | | | Sub beam Output at a Radius of 30 mm (mW) | | | |
|---|---|---|---|---|---|---|---|
| Guide Groove | AGC | TR | CRC | Guide Groove | AGC | TR | CRC |
| 0 | 0.60 | 0.60 | 0.60 | 0.20 | 0 | 0 | 0 |

Figure 14:
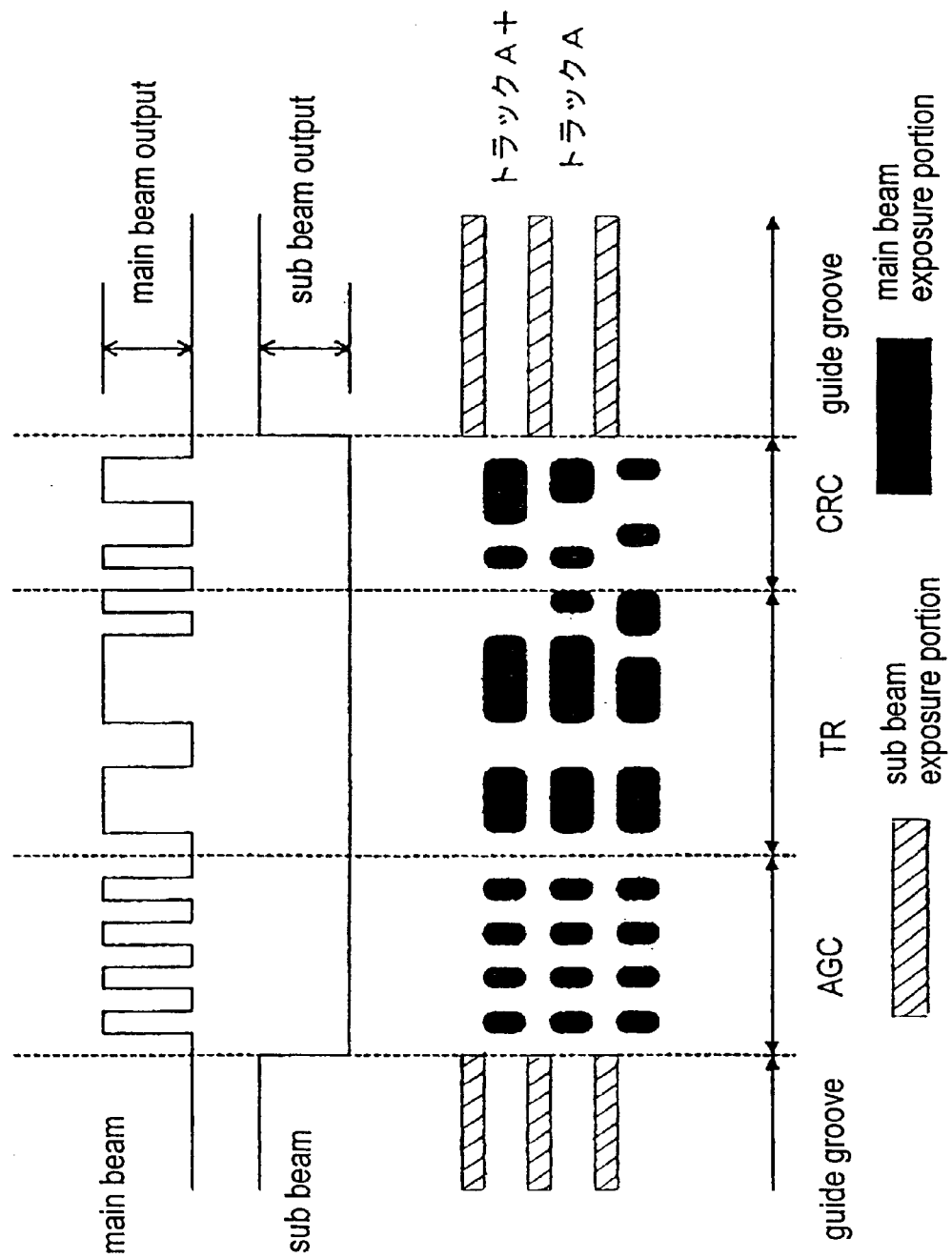
FIG. 14 is a schematic view showing output waveforms of a main beam and a sub beam of Comparative Example 4, and a resist pattern formed thereby.

A schematic plan view showing an outline of a resist pattern formed after development is shown in the lower portion of FIG. 14. The plan view of the resist pattern indicates only three tracks of a track A, a track A−1 arranged on a circumference inner by one track than the track A, and a track A+1 arranged on a circumference outer by one track than the track A. Here, portions painted out black or shaded portions are portions exposed and dissolved after development, indicating pits or guide grooves.

The resist pattern shape of the photoresist original disk thus prepared was measured under an atomic force microscope (AFM). The radial width of the pits on a resist surface was 300 nm, and the depth thereof was 85 nm.

A stamper was prepared from the photoresist original disk thus prepared, and then a polycarbonate substrate having a diameter of 130 mm and a thickness of 2 mm was formed by injection molding. An Al alloy reflective film, an SiN dielectric film, a TbFeCo film, an SiN dielectric film and a diamond-like carbon film were formed on a guide groove-formed surface of the substrate by spattering. The magneto-optical recording medium thus prepared was coated with a lubricating material from a solution of a piperonyl-modified perfluoropolyether using a perfluoropolyether solvent to a thickness of 0.3 nm by a dip coating method, thereby preparing a magneto-optical recording medium.

For the near-field optical recording type magneto-optical recording medium prepared by the above process, reproduction characteristics of pit signals were evaluated with an SIL tester having a floating slider on which an SIL having a laser wavelength (λ) of 650 nm and an effective NA of 1.4 was mounted. The focused beam diameter of this tester is 464 nm (λ/NA). The magneto-optical recording medium is rotated at 2,400 rpm, and the floating slider is floated up at a height of about 100 nm over a thin film formed surface of the medium. The laser is incident from the thin film side, and reflected on the thin film side to reproduce it. In the SIL tester used for evaluation, tracking servo is carried out by a push-pull method utilizing a diffraction effect due to the guide groove, and the presence or absence of a pit is detected by a method utilizing a diffraction effect due to the circumferential difference in level between a pit and a land.

The reproduction characteristics of the pit signals were evaluated for the case that the tracking servo was applied to the center of a pair of the adjacent guide grooves, and the case of seeking in which the floating slider radially moved at 0.7 m/s.

In the case of seeking, timing synchronism and autogain control by AGC could not be conducted, and the track number and the sector number could not be reproduced. The observation of the reproducing signal with an oscilloscope revealed that the diffraction from the radial difference in level between the pit and the land was superimposed on the signal as a noise when the laser beam crossed the AGC portion. The reason why the timing synchronism and autogain control could not be conducted is considered to be due to this noise. Further, a similar noise was also observed in the TR portion by the observation with the oscilloscope.

Comparative Example 5

Figure 15:
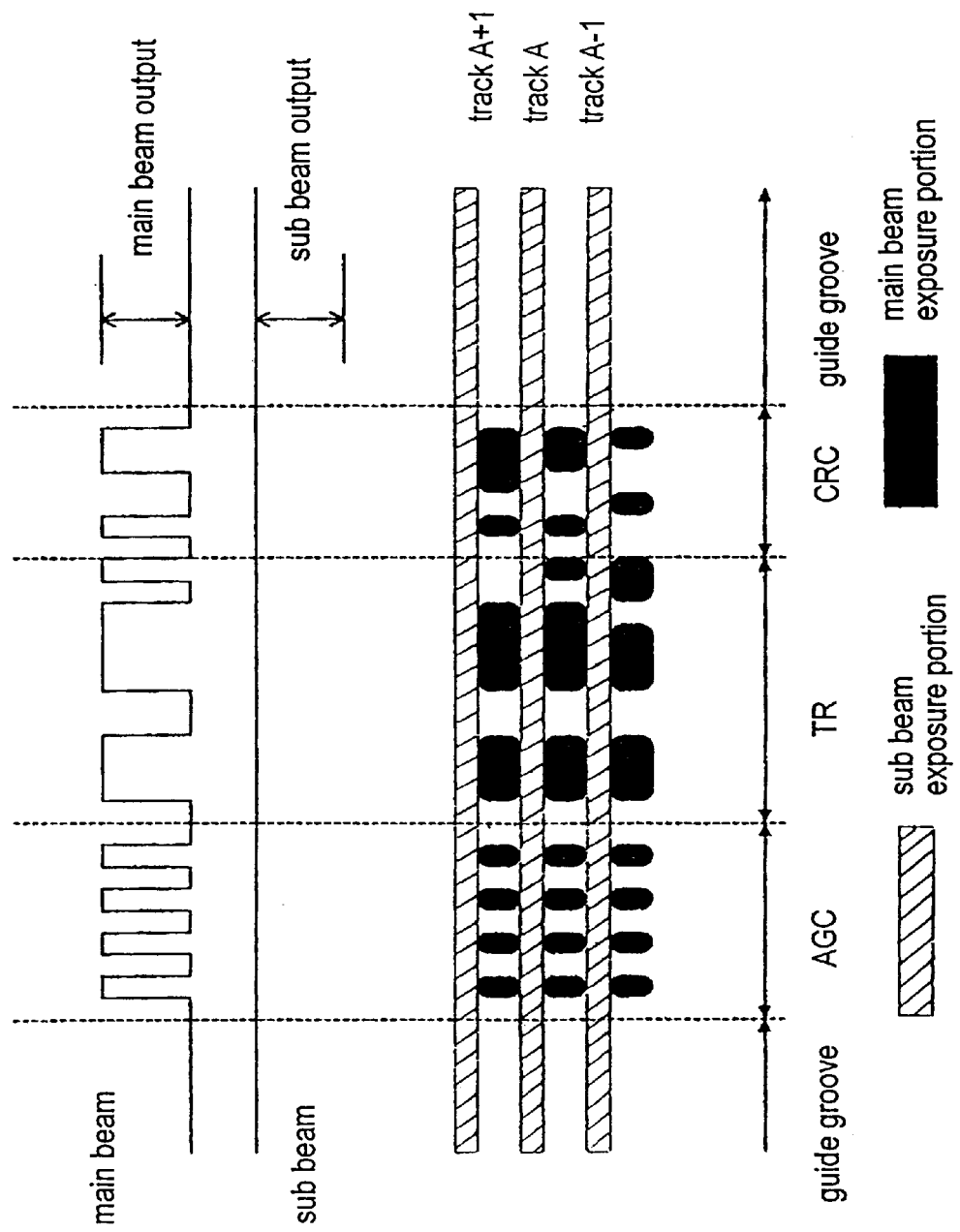
FIG. 15 is a schematic view showing output waveforms of a main beam and a sub beam of Comparative Example 5, and a resist pattern formed thereby.

Similarly to the case of Comparative Example 4, a schematic view of waveforms of a main beam and a sub beam, and a resist pattern after development is shown in FIG. 15. Set values of the outputs of the main beam and the sub beam are shown in Table 6. Other than the waveforms of the main beam and the sub beam and the set values of the outputs were the same as Comparative Example 4.

TABLE 6

| Main Beam Output at a Radius of 30 mm (mW) | | | | Sub beam Output at a Radius of 30 mm (mW) | | | |
|---|---|---|---|---|---|---|---|
| Guide Groove | AGC | TR | CRC | Guide Groove | AGC | TR | CRC |
| 0 | 0.30 | 0.30 | 0.30 | 0.20 | 0.20 | 0.20 | 0.20 |

A stamper was prepared from the photoresist original disk thus prepared, a magneto-optical recording medium was prepared in the same manner as Comparative Example 4, and reproduction characteristics of pit signals were evaluated.

During seeking, timing synchronism and autogain control by AGC could not be conducted, and the track number and the sector number could not be reproduced. The observation of the reproducing signal with an oscilloscope revealed that the diffraction from the radial difference in level between the pit and the land was superimposed on the signal as a noise when the laser beam crossed the AGC portion. The reason why the timing synchronism and autogain control could not be conducted is considered to be due to this noise. In Comparative Example 5, although the pits are continuous, the lands are completely separated for each track because continuous light is used as the sub beam. It is therefore considered that the noise is produced by this difference in level.

When the tracking servo was applied, poor timing synchronism of AGC occurred. The observation of the reproducing signal with an oscilloscope revealed that poor timing synchronism of AGC was caused by the decrease in the amplitude of detecting signals owing to the difference in level between the pits in a circumferential direction and the convex portions. It was also caused by the deviation of the signal length ratio to be reproduced at a length of 1:1, because the length of the signal corresponding to the pits was long, compared with the length of the signal corresponding to the convex portions of the substrate.

Figure 16:
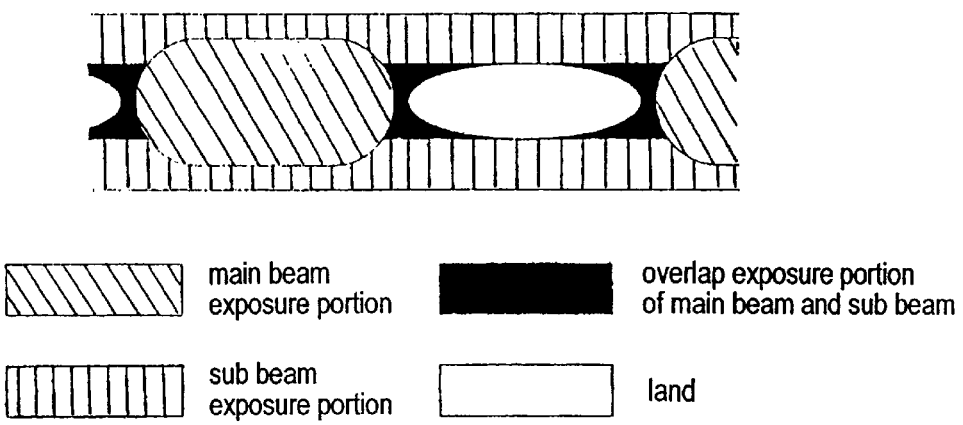
FIG. 16 is a schematic view showing a formation principle of pits and lands formed in Comparative Example 5.

The shape of pit portions of a photoresist original disk prepared under the same conditions was measured under an AFM. A land portion of an AGC portion became narrow in a circumferential direction by exposure of a sub beam, and was tapered off in shape at a front end and a back end thereof. The land end portions were tapered off because of exposure in which a end portion of a main beam was superimposed on the sub beam (FIG. 16).

The aperture diameter of the lands of the AGC portion was 100 nm at the largest position, and the circumferential length was 300 nm at the longest position. Further, the depth of a portion exposed to the sub beam between a pair of the adjacent lands of the AGC portion was 85 nm, and a glass face was exposed.

The reason why the amplitude of the signal is decreased is considered to be due to the small width of the lands, particularly the small width of the end portions. The reason why the length of the signal corresponding to the pits is long, compared with the length of the land signal is conceivably due to a decrease in land length by overlap by exposure of the sub beam.

Comparative Example 6 and Examples 15 and 16

The same photoresist original disk as Comparative Example 4 was exposed in the following manner. A schematic view of waveforms of a main beam and a sub beam, and a resist pattern after development is shown in FIG. 12. Set values of the outputs of the main beam and the sub beam are shown in Table 7. Other than the waveforms of the main beam and the sub beam and the set values of the outputs were the same as Comparative Example 4. The shape of the resist pattern was measured under an atomic force microscope. The depth of a portion exposed to the sub beam in a portion having no pit on an AGC portion was 55 nm for Comparative Example 6, 35 nm for Example 15, and 25 nm for Example 16. The width of lands on a resist surface of the AGC portion was 180 nm for Comparative Example 6, 235 nm for Example 15, and 270 nm for Example 16.

TABLE 7

| | Main Beam Output at a Radius of 30 mm (mW) | | | | Sub beam Output at a Radius of 30 mm (mW) | | | |
|---|---|---|---|---|---|---|---|---|
| | Guide Groove | AGC | TR | CRC | Guide Groove | AGC | TR | CRC |
| Comparative Example 6 | 0 | 0.30 | 0.30 | 0.30 | 0.20 | 0.18 | 0.18 | 0.18 |
| Example 15 | 0 | 0.30 | 0.30 | 0.30 | 0.20 | 0.14 | 0.14 | 0.14 |
| Example 16 | 0 | 0.30 | 0.30 | 0.30 | 0.20 | 0.10 | 0.10 | 0.10 |

A stamper was prepared from the photoresist original disk thus prepared, magneto-optical recording media were prepared in the same manner as Comparative Example 4, and reproduction characteristics of pits were evaluated.

In the magneto-optical recording medium of Comparative Example 6, results approximately similar to those of Comparative Example 5 were obtained in tracking servo and seeking, and no improvement was observed.

In Examples 15 and 16, both could reproduce good signal from pits in tracking servo. This is because the output of the sub beam to which the pit portions are continuously exposed is decreased, the overlap of exposure of the main beam and the sub beam is decreased resulting that the land width is increased, the taper of the end portions is decreased, and a decrease in land length is reduced (the land length of the AGC portion was 480 nm for Example 14, and 525 nm for Example 16). The width of reproducible lands on a resist surface is determined depending on the relationship with the beam diameter. For example, a smaller beam diameter makes it possible to reproduce at a smaller width of land. The focused beam diameter of a tester used in the experiment is 464 nm, and the width of reproducible lands is 235 nm, so that reproduction is possible at a width of 50% or more of the beam diameter.

Even in reproduction during seeking, AGC acted almost well, and TR could be read out. However, tens of readout errors occurred, based on 1,000 sectors. This error frequency had no problem in seeking continuously reproducing the track number and the sector number, and there were no failures in 1,000 cycles of seeking a desired address. The reason why the reproduction could be carried out during seeking in Examples 15 and 16 is that the depth of a portion exposed to the sub beam in a portion having no pit in the AGC portion was shallow to cause weak diffraction, resulting in a low noise.

As described above, it has become possible to produce the near-field optical recording type magneto-optical recording media in which an address can be reproduced in both seeking and tracking servo, by forming pits with a main beam, forming guide grooves with a sub beam, and conducting continuous exposure at an output of 0.5 to 0.9 time the output at which the guide grooves are formed even in the pit portions, using the mastering apparatus having the two-beam system comprising the main beam and the sub beam. Further, the magneto-optical recording media are characterized by that the pit width is larger than the groove pitch in a pit sequence, that the depth of a portion exposed to the sub beam in a portion having no pit is from 25 nm to 55 nm, and that the width of a land aperture portion in a pit sequence is 50% or more of the beam diameter, whereby an address has become reproducible in both seeking and tracking servo.

Examples 17 and 18

The same photoresist original disk used in Comparative Example 4 was exposed in the following manner. A schematic view of waveforms of a main beam and a sub beam, and a resist pattern after development is shown in FIG. 10. Set values of the outputs of the main beam and the sub beam are shown in Table 8. Here, the sub beam to which an AGC portion and a TR portion were exposed was modulated in synchronism with the modulation of the main beam.

TABLE 8

| | Main Beam Output at a Radius of 30 mm (mW) | | | | Sub beam Output at a Radius of 30 mm (mW) | | | |
|---|---|---|---|---|---|---|---|---|
| | Guide Groove | AGC | TR | CRC | Guide Groove | AGC | TR | CRC |
| Example 17 | 0 | 0.30 | 0.30 | 0.30 | 0.20 | 0.20 | 0.20 | 0.14 |
| Example 18 | 0 | 0.35 | 0.35 | 0.35 | 0.20 | 0.20 | 0.20 | 0.14 |

The observation of the resist patterns prepared by this method under an atomic force microscope showed that pits and lands each radially continued in the AGC portion, and that pits radially continued in the TR portion when the pits were arranged on the adjacent tracks. The width of the lands on a resist surface in a portion having no pit in the TR portion and having pits existing on adjacent tracks on both sides thereof, was 400 nm for Example 17, and 330 nm for Example 18.

A stamper was prepared from the photoresist original disk thus prepared, magneto-optical recording media were prepared in the same manner as Comparative Example 4, and reproduction characteristics of pits were evaluated.

For the magneto-optical recording media of Examples 17 and 18, it was possible to reproduce the signal of the pits with no problem in tracking servo, AGC acted well and TR was able to be read out even in reproduction during seeking, and no error occurred in 1,000 sectors. The AGC signal became reproducible by allowing the pits and the lands to each radially continue in the AGC portion, and the signal of the TR portion also became reproducible by forming the land width of the TR portion to a width sufficient to the focused beam diameter.

The jitter of the signal of the AGC portion reproduced during seeking was measured. As a result, the jitter value was 20% and 18% based on the readout window width, for Example 17 and Example 18, respectively, which could afford the error.

As described above, it has become possible to produce the near-field optical recording type magneto-optical recording medium in which an address can be reproduced in both seeking and tracking servo, by using the mastering apparatus having the two-beam system comprising a main beam and a sub beam, which medium is produced by forming pits with the main beam, forming the guide grooves with the sub beam, and exposing the AGC portions and TR portions of the pit portions to the sub beam modulated in synchronism with the modulation of the main beam, Further, the magneto-optical recording media are characterized in that the pit width is larger than the groove pitch in a pit sequence of the AGC portion or the TR portion, that when the pits are arranged between the adjacent tracks, the pits radially continue, and that the lands are arranged as a portion having no pit continues between the tracks, whereby an address has become reproducible in both seeking and tracking servo.

Examples 19, 20 and 21

The shape of an AGC portion of a photoresist original disk prepared under the same conditions as Examples 17 and 18 was observed under an AFM. As a result, a boundary between lands and pits was winding. As to the lands of the AGC portion, the difference between the longest portion and the shortest portion was 240 nm for Example 17, and 220 nm for Example 18.

Figure 17:
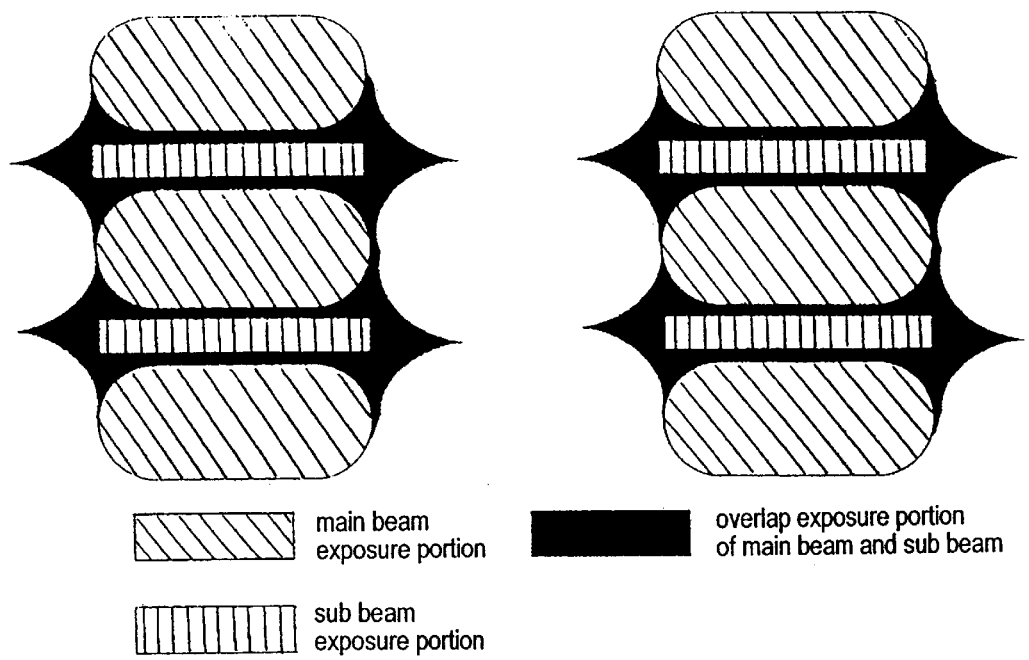
FIG. 17 is a schematic view showing one example of a state of a boundary between pits and lands of an AGC portion.

This is conceivably because exposure proceeds on an extended line of the sub beam by overlap of sub beam exposure with main beam exposure, due to the long pulse width of the sub beam, as shown in FIG. 17.

Figure 18:
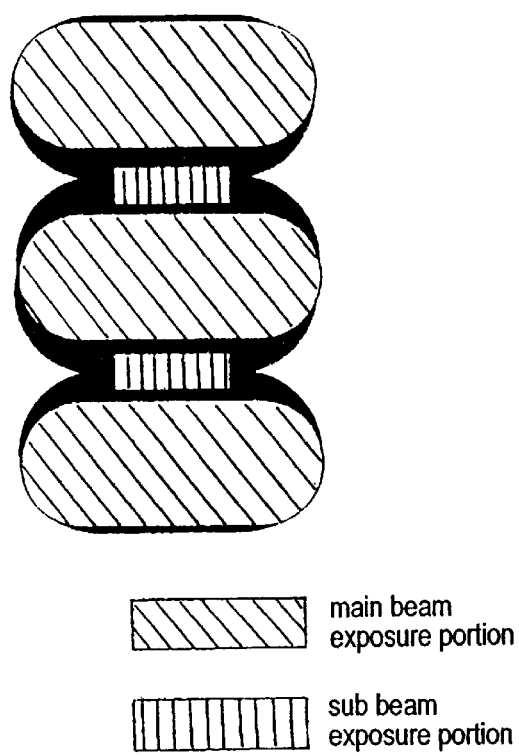
FIG. 18 is a schematic view showing another example of a state of a boundary between pits and lands of an AGC portion.
Figure 18:
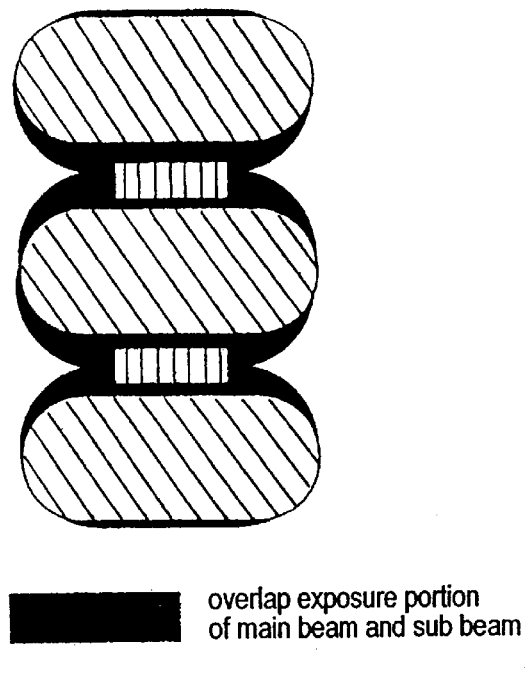
Figure 19:
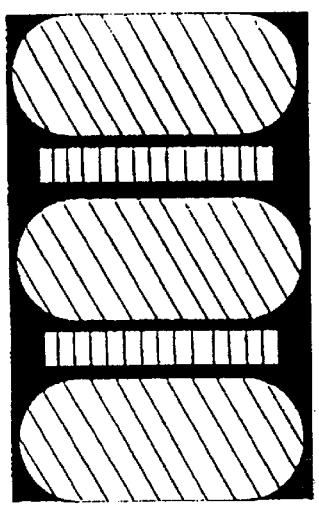
FIG. 19 is a schematic view showing an optimized state of a boundary between pits and lands of an AGC portion.
Figure 19:
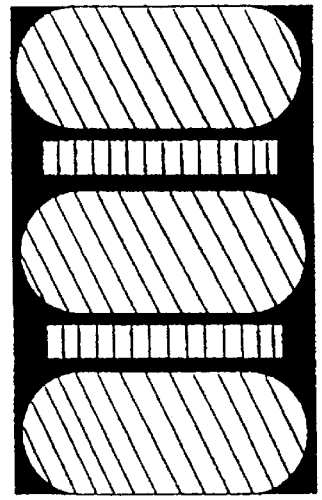
Figure 19:
Figure 19:
Figure 19:

In Examples 17 and 18, the sub beam to which the AGC portion is exposed in synchronism with the modulation of the main beam is long, so that the boundary between the lands and the pits becomes winding. This problem can be dealt with by decreasing the length of the sub beam to that of the main beam. A conceptual illustration of a forming state of pits in the case that the length of the sub beam is short is shown in FIG. 18. Exposure by overlap of the main beam with the main beam at end portions does not proceed because of the short sub beam, resulting in such a winding boundary that the pits are constricted. The same applies in the case that the output of the main beam is increased without exposure to the sub beam. When the length of the sub beam is properly controlled, it is possible to straighten the boundary between the lands and the pits as shown in FIG. 19.

The same photoresist original disk as Comparative Example 4 was exposed in the following manner.

Examples 19, 20 and 21 were prepared using a sub beam and a main beam having the same output and waveform as Example 17, with the exception that the time of the sub beam modulated in synchronism with the modulation of the main beam in the AGC portion and the TR portion was changed. In Example 19, the rise of the sub beam to be modulated was delayed by 10 ns, and the fall was advanced by 10 ns, thereby shortening the pulse width by 20 ns. In Example 20, the rise of the sub beam to be modulated was delayed by 20 ns, and the fall was advanced by 20 ns, thereby shortening the pulse width by 40 ns. In Example 21, the rise of the sub beam to be modulated was delayed by 40 ns, and the fall was advanced by 40 ns, thereby shortening the pulse width by 80 ns. Stampers were prepared from the photoresist original disks exposed under such conditions, magneto-optical recording media were prepared in the same manner as Comparative Example 4, and reproduction characteristics of pit signals were evaluated in the same manner as Comparative Example 4.

For all of Examples 19, 20 and 21, no error occurred in reproduction characteristics. The jitter value during seeking was 14%, 12% and 22%, based on the readout window width, for Example 19, Example 20 and Example 21, respectively. The shape of AGC portions of photoresist original disks produced under the same conditions as Example 19, 20 and 21 was observed under a scanning electron microscope. As a result, the difference between the longest portion and the shortest portion of lands of the AGC portion was 200 nm for Example 19, 160 nm for Example 20, and 260 nm for Example 21. It has become clear that when the difference between the longest portion and the shortest portion of lands of the AGC portion is small, that is to say, when the winding variation of the boundary between the lands and the pits is small and more linear, the jitter is small.

Thus, it has become possible to produce the near-field optical recording type magneto-optical recording media in which an address can be reproduced in both seeking and tracking servo, using the mastering apparatus having the two-beam system comprising the main beam and the sub beam, which medium is produced by forming pits with the main beam, forming the guide grooves with the sub beam, and besides, exposing the AGC portions and TR portions of the pit portions to the sub beam modulated as a pulse shorter than a pulse of the main beam in synchronism with the modulation of the main beam.

The magneto-optical recording media are characterized in that they have linear boundaries between the pits and the tracks of the AGC portions and the TR portions, whereby the reproduction jitter in seeking has become reducible.

INDUSTRIAL APPLICABILITY

According to the present invention, there can be provided the optical recording media in which the header signals become reproducible in both tracking servo and seeking, and which have high seek speed, namely high recording/reproduction speed. The optical recording media can be suitably used as an optical recording media for reproduction only, additional write type optical recording media, rewritable optical recording media and so on.

What is claimed is:

1. An optical recording medium having a header region in which at least a signal for address reproduction is recorded by an unevenness pattern on a substrate,
   wherein, in said header region, an unevenness pattern corresponding to a reproducing signal in seeking reproduced when an optical head moves between tracks in recording/reproduction of said optical recording medium is comprised of concave portions constituting the reproducing signal in seeking,
   wherein said concave portions in positions equivalent to each other between two or more adjacent tracks are connected to each other in a direction orthogonal to the tracks, and wherein a continuous portion formed by a series of edges of the connected concave portions, which series of edges is in a direction crossing the tracks, is formed in an arc shape along a locus of the moving optical head as a whole, and the degree of swelling thereof is not more than one third of the minimum recording unit.

2. The optical recording medium according to claim 1, wherein an edge of the connected concave portions, which edge is approximately parallel to a direction orthogonal to the tracks, is formed as a boundary between a concave portion and a portion where no concave is formed on the medium.

3. The optical recording medium according to claim 1, wherein a concave portion constituting the reproducing signal in seeking which has no adjacent concave portions constituting the reproducing signal in seeking in the equivalent position on the adjacent track, is formed beyond a boundary line between the track having said concave portion and said adjacent track to protrude into a part of said adjacent track.

4. An optical recording medium having a header region in which at least a signal for address reproduction is recorded by an unevenness pattern on a substrate,
wherein, in said header region, an unevenness pattern corresponding to a reproducing signal in seeking reproduced when an optical head moves between tracks in recording/reproduction of the optical recording medium is comprised of convex portions constituting the reproducing signal in seeking,
wherein said convex portions in positions equivalent to each other between two or more adjacent tracks are connected to each other in a direction orthogonal to the tracks, and
wherein a continuous portion formed by a series of edges of the connected convex portions, which series of edges is in a direction crossing the tracks, is formed in an arc shape along a locus of the moving optical head as a whole, and the degree of swelling thereof is not more than one third of the minimum recording unit.

5. The optical recording medium according to claim 1, wherein an edge of the connected convex portions, which edge is approximately parallel to a direction orthogonal to the tracks, is formed as a boundary between a convex portion and a portion where a concave is formed on the medium.

6. The optical recording medium according to claim 4, wherein a convex portion constituting the reproducing signal in seeking which has no adjacent convex portions constituting the reproducing signal in seeking in the equivalent position on the adjacent track, do not reach a boundary line between the track having said convex portion and said adjacent track.

7. An optical recording medium having a flat portion for writing a header signal, and a header region in which a timing signal indicating timing for writing the header signal is recorded in a part of the flat portion by an unevenness pattern on a substrate, wherein convex portions and/or concave portions constituting said timing signal are formed by connecting them to each other across a plurality of tracks in a direction crossing the tracks, and
wherein an edge of the connected convex portions and/or concave portions constituting the timing signal for writing the header signal, which edge is in a direction crossing the tracks, is formed in an arc shape along a locus of the moving optical head as a whole, and the degree of swelling thereof is not more than one third of the minimum recording unit.

8. The optical recording medium according to claim 7, wherein the convex portions and/or concave portions constituting the timing signal for writing the header signal are formed by connecting them to each other from the most inner periphery to the most outer periphery.

9. An optical recording medium having a header region in which header information containing at least a signal for address reproduction or a signal acting as a reference for address writing is recorded by an unevenness pattern on a substrate, and conducting recording and/or reproduction using both of land tracks formed on lands and groove tracks formed on grooves, wherein, when concave portions and/or convex portions constituting the reproducing signal in seeking reproduced in the movement of an optical head between the tracks are in positions equivalent to each other between two or more adjacent tracks, they are connected to each other in a direction orthogonal to the tracks,
wherein an edge of the connected concave portions and/or convex portions which are in positions equivalent to each other between two or more adjacent tracks, which edge is in a direction crossing the tracks, is formed in an arc shape along a locus of the moving optical head as a whole, and the degree of swelling thereof is not more than one third of the minimum recording unit.

10. The optical recording medium according to claim 9, wherein the land tracks and groove tracks each have different header information.

11. The optical recording medium according to claim 10, wherein when the concave portions and/or convex portions constituting the reproducing signal in seeking are not in positions equivalent to each other between the adjacent tracks, a boundary between the concave portions and convex portions constituting the reproducing signal in seeking is rather on the side of the convex portions constituting the reproducing signal in seeking than a track boundary.

12. An optical recording medium having a header region in which header information containing at least a signal for address reproduction or a signal acting as a reference for address writing is recorded by an unevenness pattern on a substrate, and conducting recording and/or reproduction using both of land tracks formed on lands and groove tracks formed on grooves, wherein, when concave portions and/or convex portions constituting the reproducing signal in seeking reproduced in the movement of an optical head between the tracks are in positions equivalent to each other between two or more adjacent tracks, they arc connected to each other in a direction orthogonal to the tracks,
wherein a pair of land track and groove track adjacent to each other share header information, and
wherein an edge of the connected concave portions and/or convex portions which are in positions equivalent to each other between two or more adjacent tracks, which edge is in a direction crossing the tracks, is formed in an arc shape along a locus of the moving optical head as a whole, and the degree of swelling thereof is not more than one third of the minimum recording unit.

13. The optical recording medium according to claim 12, wherein when the concave portions and/or convex portions constituting the reproducing signal in seeking are not in positions equivalent to each other between the adjacent tracks, a boundary between the concave portions and the convex portions constituting the reproducing signal in seeking is rather on the side of the convex portions constituting the reproducing signal in seeking than a track boundary.

14. An optical recording medium having a header region in which at least a signal for address reproduction is recorded by an unevenness pattern on a substrate, wherein, in said header region, an unevenness pattern corresponding to a reproducing signal in seeking reproduced when an optical head moves between tracks in recording/reproduction of said optical recording medium is comprised of concave portions constituting the reproducing signal in seeking, wherein said concave portions in positions equivalent to each other between two or more adjacent tracks are connected to each other in a direction orthogonal to the tracks, wherein a concave portion constituting the reproducing signal in seeking, which has no adjacent concave portions constituting the reproducing signal in seeking in the equivalent position on the adjacent track, is formed beyond a boundary line between the track having said concave portion and said adjacent track to protrude into a part of said adjacent track, and wherein a continuous portion formed by a series of edges of the connected concave portions, which series of edges is in a direction crossing the tracks, is formed in an approximately linear shape approximately parallel to a direction orthogonal to the tracks as a whole, and the degree of swelling thereof is not more than one third of the minimum recording unit.

15. The optical recording medium according to claim 14, wherein an edge of the connected concave portions, which edge is approximately parallel to a direction orthogonal to the tracks, is formed as a boundary between a concave portion and a portion where no concavity is formed on the medium.

16. An optical recording medium having a header region in which at least a signal for address reproduction is recorded by an unevenness pattern on a substrate, wherein, in said header region, an unevenness pattern corresponding to a reproducing signal in seeking reproduced when an optical head moves between tracks in recording/reproduction of the optical recording medium is comprised of convex portions constituting the reproducing signal in seeking, wherein said convex portions in positions equivalent to each other between two or more adjacent tracks are connected to each other in a direction orthogonal to the tracks, wherein a convex portion constituting the reproducing signal in seeking which has no adjacent convex portions constituting the reproducing signal in seeking in the equivalent position on the adjacent track, do not reach a boundary line between the track having said convex portion and said adjacent track, and wherein a continuous portion formed by a series of edges of the connected convex portions, which series of edges is in a direction crossing the tracks, is formed in an approximately linear shape approximately parallel to a direction orthogonal to the tracks as a whole, and the degree of swelling thereof is not more than one third of the minimum recording unit.

17. The optical recording medium according to claim 16, wherein an edge of the connected convex portions, which edge is approximately parallel to a direction orthogonal to the tracks, is formed as a boundary between a convex portion aid a portion where a concave is formed on the medium.

18. An optical recording medium having a header region in which header information containing at least a signal for address reproduction is recorded by an unevenness pattern on a substrate, and conducting recording and/or reproduction using both of land tracks formed on lands and groove tracks formed on grooves, wherein, when concave portions and/or convex portions constituting the reproducing signal in seeking reproduced in the movement of an optical head between the tracks are in positions equivalent to each other between two or more adjacent tracks, they are connected to each other in a direction orthogonal to the tracks, wherein when the concave portions and/or convex portions constituting the reproducing signal in seeking are not in positions equivalent to each other between the adjacent tracks, a boundary between the concave portions and convex portions constituting the reproducing signal in seeking is rather on the side of the convex portions constituting the reproducing signal in seeking than a track boundary, and wherein an edge of the connected concave portions and/or convex portions which are in positions equivalent to each other between two or more adjacent tracks, which edge is in a direction crossing the tracks, is formed in an approximately linear shape approximately parallel to a direction orthogonal to the tracks as a whole, and the degree of swelling thereof is not more than one third of the minimum recording unit.

19. The optical recording medium according to claim 18, wherein the land tracks and groove tracks each have different header information.

20. The optical recording medium according to claim 18, wherein a pair of land track and groove track adjacent to each other share header information.

* * * * *